US012134312B2

(12) United States Patent
Kamei et al.

(10) Patent No.: US 12,134,312 B2
(45) Date of Patent: Nov. 5, 2024

(54) VEHICLE-BODY STRUCTURE OF ELECTRIC AUTOMOTIVE VEHICLE

(71) Applicant: MAZDA MOTOR CORPORATION, Hiroshima (JP)

(72) Inventors: Takehiro Kamei, Hiroshima (JP); Takayuki Kimura, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 359 days.

(21) Appl. No.: 17/654,730

(22) Filed: Mar. 14, 2022

(65) Prior Publication Data

US 2022/0379705 A1 Dec. 1, 2022

(30) Foreign Application Priority Data

Jun. 1, 2021 (JP) .................................. 2021-092539

(51) Int. Cl.
*B62D 21/02* (2006.01)
*B60K 1/04* (2019.01)
*B62D 25/02* (2006.01)
*B62D 25/20* (2006.01)

(52) U.S. Cl.
CPC ................ *B60K 1/04* (2013.01); *B62D 21/02* (2013.01); *B62D 25/025* (2013.01); *B62D 25/2036* (2013.01); *B60K 2001/0438* (2013.01)

(58) Field of Classification Search
CPC .... B60K 2001/0405; B60K 2001/0438; B62D 21/02; B62D 21/03; B62D 25/025; B62D 25/2036
See application file for complete search history.

(56) References Cited

U.S. PATENT DOCUMENTS

| 5,501,289 | A | * | 3/1996 | Nishikawa | ............... B60K 1/04 280/783 |
| 7,610,978 | B2 | * | 11/2009 | Takasaki | ................ B62D 25/20 429/96 |
| 7,824,797 | B2 | * | 11/2010 | Nishino | ................ H01M 50/26 429/154 |
| 7,997,368 | B2 | * | 8/2011 | Takasaki | ................ B60L 50/64 180/68.5 |
| 8,733,487 | B2 | * | 5/2014 | Usami | .................... B62D 21/11 180/68.5 |
| 8,939,246 | B2 | * | 1/2015 | Yamaguchi | ............. B60L 50/66 180/311 |
| 9,812,746 | B2 | * | 11/2017 | Katayama | ............... B60L 58/20 |
| 9,994,260 | B2 | * | 6/2018 | Ito | ........................ B62D 21/152 |
| 10,647,213 | B2 | * | 5/2020 | Otoguro | ................... B60K 1/04 |
| 10,882,557 | B2 | * | 1/2021 | Otoguro | ................... B60K 1/04 |
| 11,524,726 | B2 | * | 12/2022 | Fujisawa | ................. B60K 1/04 |

(Continued)

FOREIGN PATENT DOCUMENTS

| EP | 2 402 192 A1 | 1/2012 |
| JP | 2018-187986 A | 11/2018 |

*Primary Examiner* — Jeffrey J Restifo
(74) *Attorney, Agent, or Firm* — Studebaker & Brackett PC

(57) ABSTRACT

A vehicle-body structure of an electric automotive vehicle comprises floor-side cross members attached to a floor panel and extending in a vehicle width direction along the floor panel and battery-side cross members provided at a battery case and extending in the vehicle width direction. The floor-side cross members and the battery-side cross members are offset from each other in a vehicle longitudinal direction in a vehicle side view.

12 Claims, 14 Drawing Sheets

(56) References Cited

U.S. PATENT DOCUMENTS

| | | | |
|---|---|---|---|
| 11,820,432 B2* | 11/2023 | Kamei | B62D 25/025 |
| 11,958,350 B2* | 4/2024 | Korada | B60L 50/64 |
| 2012/0097466 A1* | 4/2012 | Usami | B60K 1/04 |
| | | | 180/68.5 |
| 2014/0329125 A1* | 11/2014 | Miyanaga | B60R 13/0861 |
| | | | 429/100 |
| 2015/0255764 A1* | 9/2015 | Loo | H01M 50/249 |
| | | | 429/149 |
| 2018/0237075 A1* | 8/2018 | Kawabe | B60L 50/66 |
| 2018/0312199 A1* | 11/2018 | Kawase | B60K 1/04 |
| 2022/0379705 A1* | 12/2022 | Kamei | B62D 25/2036 |
| 2022/0379706 A1* | 12/2022 | Hiramatsu | B62D 21/11 |
| 2022/0379962 A1* | 12/2022 | Kamei | B62D 21/15 |
| 2022/0379963 A1* | 12/2022 | Kamei | B62D 21/15 |
| 2023/0099466 A1* | 3/2023 | Inami | B60R 19/12 |
| | | | 293/102 |
| 2023/0249533 A1* | 8/2023 | Satou | B60K 1/04 |
| | | | 180/68.5 |
| 2023/0311795 A1* | 10/2023 | Mukaigawa | B60R 16/04 |
| | | | 180/68.5 |
| 2024/0001992 A1* | 1/2024 | Lee | B60K 1/04 |
| 2024/0017770 A1* | 1/2024 | Yoshida | H01M 50/249 |

\* cited by examiner

VEHICLE-BODY STRUCTURE OF ELECTRIC AUTOMOTIVE VEHICLE

BACKGROUND OF THE INVENTION

The present invention relates to a vehicle-body structure of an electric automotive vehicle.

In an automotive vehicle comprising a motor for vehicle driving (i.e., a driving motor), for example, a battery unit to supply electric power to the motor for vehicle driving is installed and this battery unit is designed to have a larger capacity so as to provide a longer drivable (cruising) distance.

Japanese Patent Laid-Open Publication No. 2018-187986 (US 2018/0312199 A1) discloses an automotive vehicle in which a battery unit is provided below a floor. In this patent document, a cross member extending in a vehicle width direction is attached to an upper face of a floor panel of the vehicle and also a cross member extending in the vehicle width direction is attached to a lower face of the floor panel. Herein, the cross member attached to the upper face of the floor panel and the cross member attached to the lower face of the floor panel are provided to be offset from each other in a vehicle longitudinal direction.

In the above-described patent document, when a collision load is inputted to a rocker in a vehicle side collision, an upper portion of an impact absorption portion is plastically deformed by a reaction force applied from an opposite rocker which is positioned on an opposite side to the rocker where the collision load is inputted, so that collision energy is absorbed. Also, a lower portion of the impact absorption portion is plastically deformed by a reaction force applied from the battery unit, so that the collision energy is absorbed as well.

Herein, the automotive vehicle is required to further improve the collision safety. In particular, in a case where the large collision load is inputted from a vehicle-body side, it is required that deformation of a cabin caused by the collision load is suppressed and also battery cells installed below the floor are protected. In this regard, according to the above-described patent document, since the floor panel and the cross members attached to the floor panel receive the collision load, the collision load comes to concentrate at these members.

Moreover, since the number of the cross members attached to the floor panel is not made to be so many, it may be considered that in a case where an obstacle like a pole, for example, hits against a side part of the vehicle, this pole hits at a position between the cross members arranged longitudinally.

SUMMARY OF THE INVENTION

The present invention has been devised in view of the above-described matter, and an object of the present invention is to provide a vehicle-body structure of an electric automotive vehicle which can properly improve the protection performance of the battery by dispersing and transmitting the collision load inputted in the vehicle side collision to a vehicle body and a battery case.

The present invention is a vehicle-body structure of an electric automotive vehicle, in which a motor for vehicle driving is provided and a battery case where a battery to supply electric power to the motor for vehicle driving is stored is arranged below a floor panel, comprising a floor-side cross member attached to the floor panel and extending in a vehicle width direction along the floor panel, and a battery-side cross member provided at the battery case and extending in the vehicle width direction, wherein the floor-side cross member and the battery-side cross member are offset from each other in a vehicle longitudinal direction in a vehicle side view.

According to the present invention, in a case where an obstacle like a pole, for example, hits against a side part of the vehicle, since the floor-side cross member and the battery-side cross member are offset from each other in the vehicle longitudinal direction, the collision load can be inputted to at least one of the cross members. Further, in a case where the obstacle is the pole with a large diameter, an automotive vehicle, or the like, the collision load is inputted to both of the floor-side cross member and the battery-side cross member, so that the collision load can be dispersed and transmitted to the vehicle body and the battery case. Since the floor-side cross member extends in the vehicle width direction in a state where it is attached to the floor panel, a resistant force against the load applied from the vehicle side is so large that part of the collision load can be absorbed. Further, since the battery-side cross member extends in the vehicle width direction as well, the resistance force against the load applied from the vehicle side is large. Thereby, the battery provided inside the battery case can be protected properly.

In an embodiment of the present invention, the vehicle-body structure of the electric automotive vehicle further comprises a pair of right-and-left side sills extending in the vehicle longitudinal direction at both end portions, in the vehicle width direction, of the floor panel, and a pair of right-and-left pillars extending upward respectively from the side sills, wherein only the floor-side cross member and the battery-side cross member, which are located in a non-overlapping area with the pillar, are offset from each other in the longitudinal direction in the vehicle side view.

Herein, since the strength of part of the vehicle body provided with the pillar against the collision load applied from the vehicle side is high, the collision load can be received at the pillar even if the floor-side cross member and the battery-side cross member are not offset from each other in the longitudinal direction. Therefore, according to this embodiment in which the floor-side cross member and the battery-side cross member, which are located in the non-overlapping area with the hinge pillar, are offset from each other in the longitudinal direction in the vehicle side view, the protection performance of the battery can be secured sufficiently.

In another embodiment of the present invention, the floor-side cross member is attached to an upper face of the floor panel.

According to this embodiment, since the floor-side cross member and the battery-side cross member can be spaced apart from each other in a vertical direction, the collision load can be securely dispersed toward the vehicle-body side and the battery-case side.

In another embodiment of the present invention, the floor-side cross member and the battery-side cross member respectively overlap a pair of right-and-left side sills which are provided to extend in the vehicle longitudinal direction at both end portions, in the vehicle width direction, of the floor panel in the vehicle side view.

According to this embodiment, the collision load of the vehicle side collision can be transmitted to the floor-side cross member and the battery-side cross member through the side sill.

In another embodiment of the present invention, the floor-side cross member and the battery-side cross member are provided alternately in the vehicle longitudinal direction.

According to this embodiment, since the collision load applied from the obstacle can be inputted to the floor-side cross member and the battery-side cross member, this collision load can be securely dispersed toward the vehicle-body side and the battery-case side.

The present invention will become apparent from the following description which refers to the accompanying drawings.

DETAILED DESCRIPTION OF THE INVENTION

Figure 1:
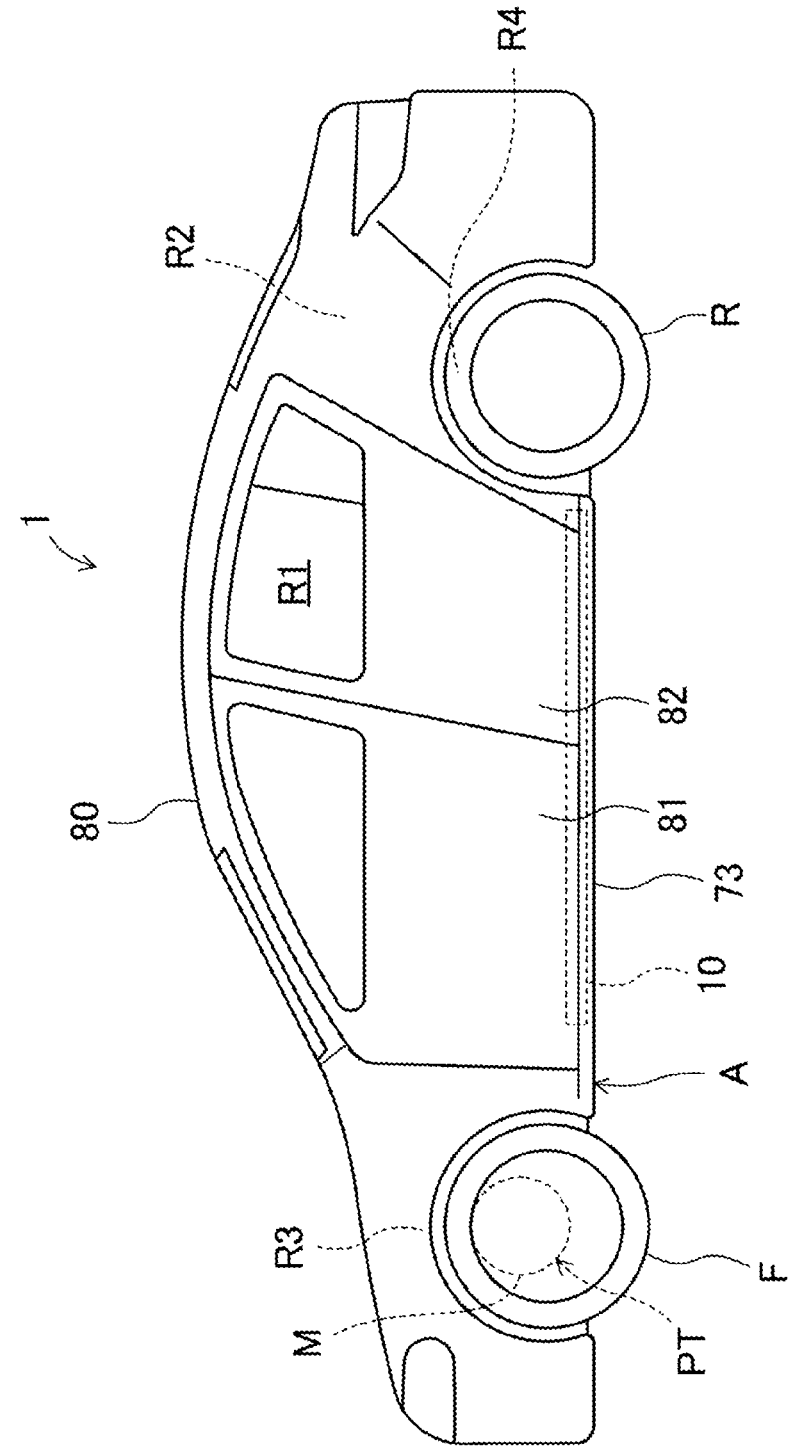
FIG. 1 is a side view of an electric automotive vehicle according to an embodiment of the present invention.

Hereafter, embodiments of the present invention will be described specifically referring to the drawings. The following preferred embodiments just exemplify essentially, and therefore these do not limit the present invention, its adaption, or its use.

Figure 2:
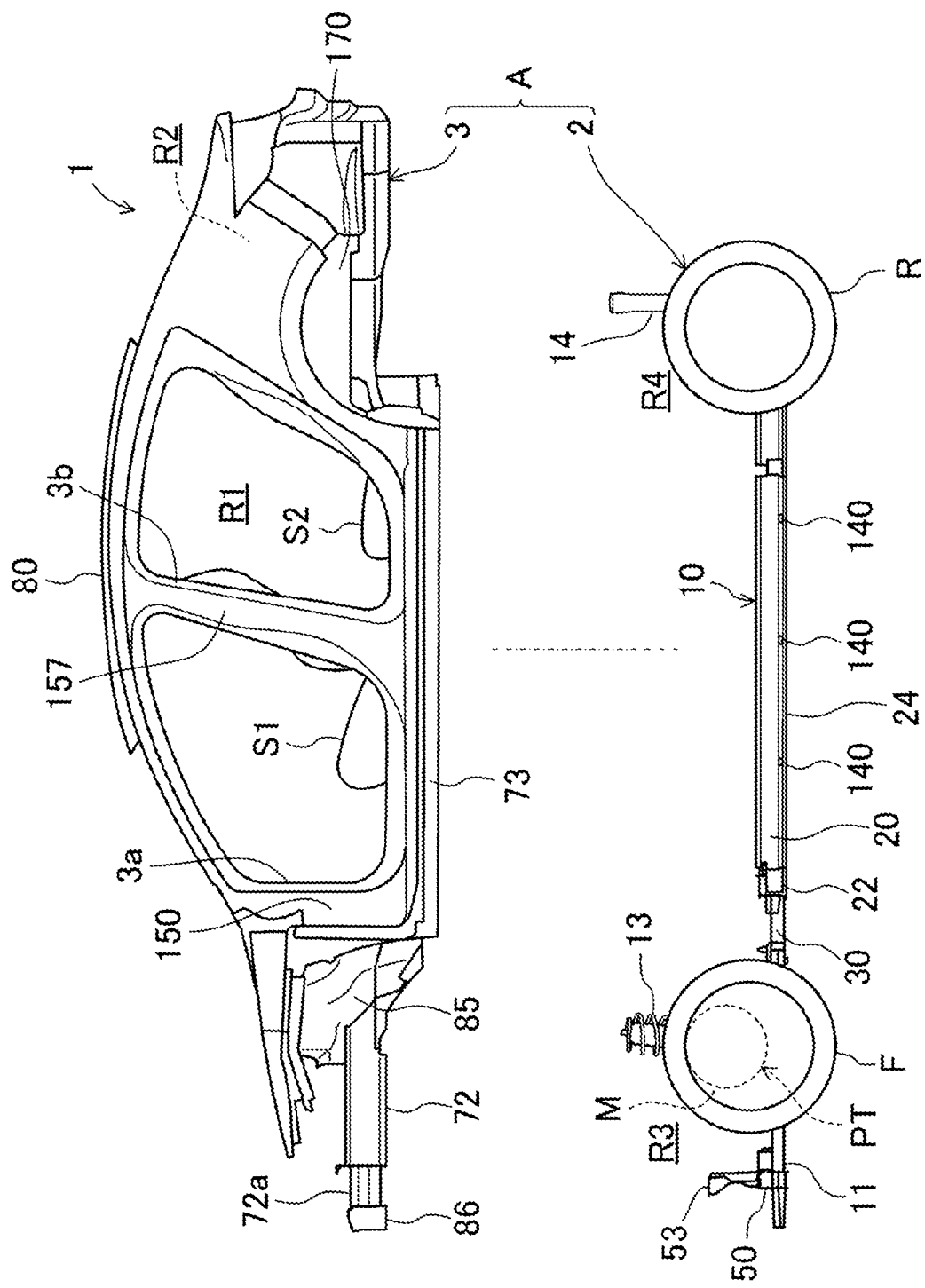
FIG. 2 is a side view of the electric automotive vehicle in a state where it is split into a lower structural body and an upper structural body.

FIG. 1 is a left side view of an electric automotive vehicle 1 which is provided with a vehicle-body structure A according to the embodiment of the present invention. This electric automotive vehicle 1 comprises, as shown in FIG. 2, a lower structural body 2 and an upper structural body 3, and the vehicle-body structure A is constituted by the lower structural body 2 and the upper structural body 3. FIG. 2 shows a state where doors, a bonnet hood, a front fender, a widow glass, a bumper, front-and-rear lights, and others are removed. Herein, in the following description of the present embodiment, a vehicle front side is just referred to as "front," a vehicle rear side is just referred to as "rear," a vehicle right side is just referred to as "right," and a vehicle left side is just referred to as "left." A lateral direction of the vehicle is a vehicle width direction.

As shown in FIG. 1, the electric automotive vehicle 1 is a passenger car. As shown in FIG. 2, a front seat S1 is provided at a front side in a cabin R1 as a residential space of passengers, and a rear seat S2 is provided in back of the front seat S1 in the cabin R1. A baggage room R2 is provided in back of the rear seat S2 as needed. The cabin R1 and the baggage room R2 are provided at the upper structural body 3. Herein, only the front seat S1 may be provided in the cabin R and a third-row seat (not illustrated) may be provided behind the rear seat S2.

Meanwhile, a front space before the cabin R1 of the electric automotive vehicle 1 can be constituted by a power room R3, for example. That is, the vehicle-body structure A comprises a motor for vehicle driving M (hereafter, referred to as the "driving motor") to generate driving power to drive vehicle's driving wheels and a battery case 10 where a battery B (shown only in FIG. 4) to supply electric power are provided. A powertrain PT is constituted by the driving motor M only, or by the driving motor M, reduction gears, a transmission, and others. FIGS. 1 and 2 show a case where the powertrain PT is provided only in the power room R3, but the powertrain PT may be provided in a lower space R4 of the baggage room R2 (not illustrated). In the case where the powertrain PT is provided only in the power room R3, only front wheels F are driven. In the case where the powertrain PT is provided in the lower space R4, only rear wheels R are driven. In this case, the power room R3 is usable as a baggage-room space or the like. Further, in a case where the powertrain PT is provided both in the power room R3 and the lower space R4, this vehicle is a four-wheel drive car. The battery case 10 is arranged below a floor panel 70 which will be described later.

Figure 3:
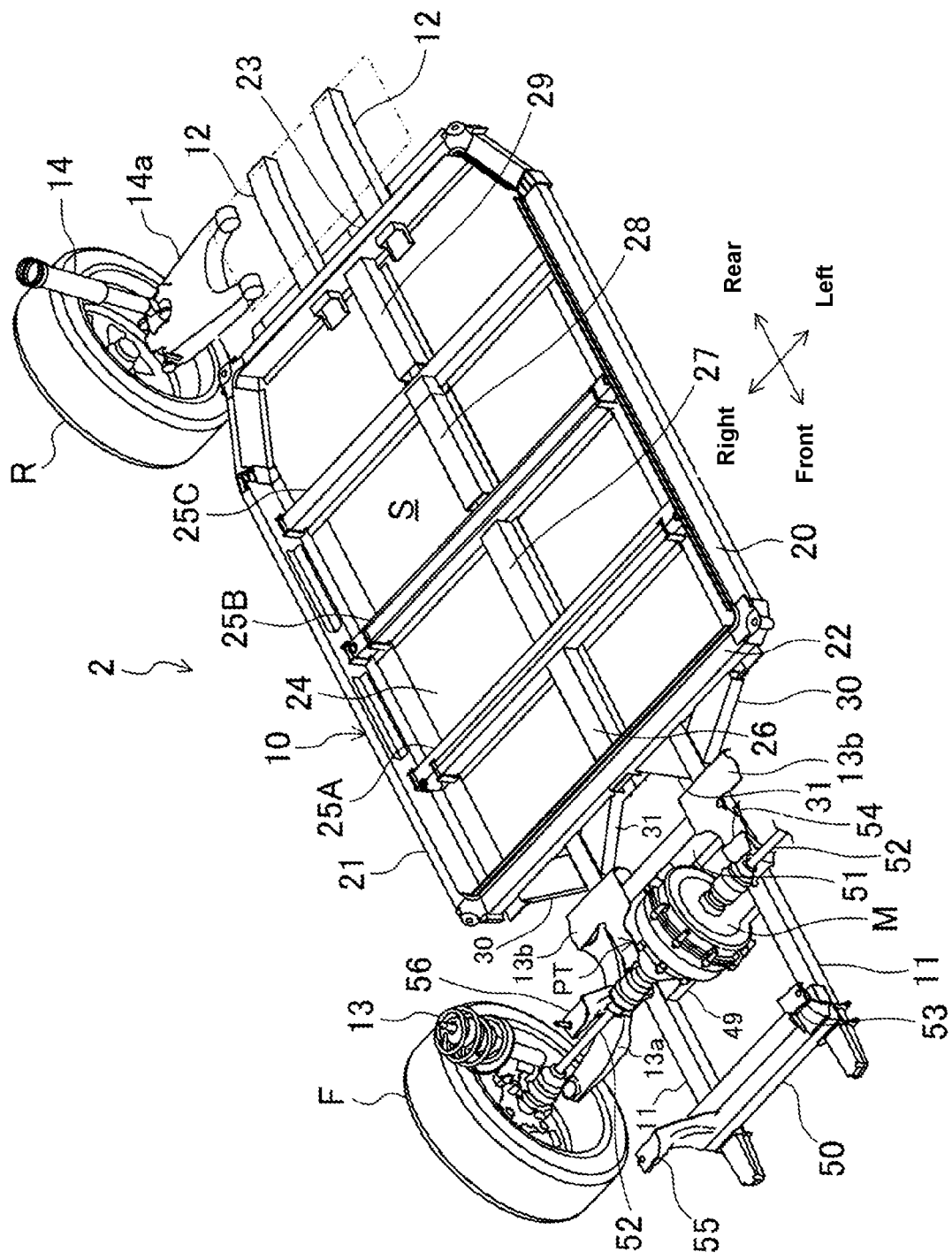
FIG. 3 is a perspective view of the lower structural body, when viewed from a vehicle upper side.
Figure 4:
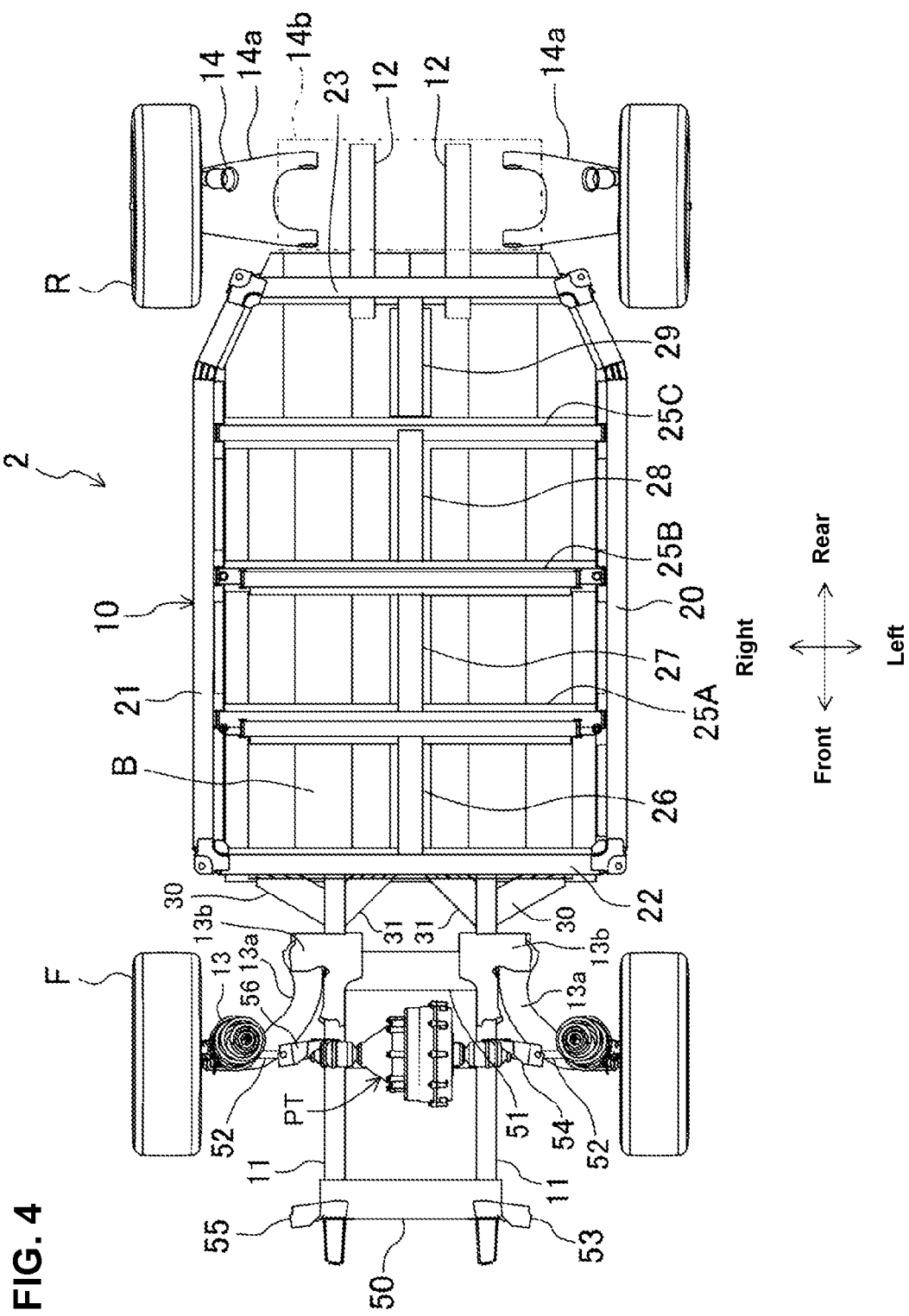
FIG. 4 is a plan view of the lower structural body.

As shown in FIGS. 3 and 4, the lower structural body 2 comprises the battery case 10, a pair of front frame members 11 which extend forward in front of the battery case 10 and a pair of rear frame members 12 which extend rearward in back of the battery case 10. In FIG. 3, illustration of the left-side elements, such as the front wheel F, the rear wheel R, suspension arms, and others is omitted.

In a case of the general electric automotive vehicle, the battery case is detachably attached below the floor, separately from a vehicle body. In the present embodiment, however, the front frame members 11 and the rear frame members 12 are integrally formed at the battery case 10, and these members 10, 11, 12 are together detachably attached to the upper structural body 3.

Specifically, the electric automotive vehicle 1 of the present embodiment is vertically split into the lower structural body 2 provided with the battery case 10 and the upper structural body 3 provided with the cabin R1 and the baggage room R2. This vertical-split constitution means the structure where the lower structural body 2 is integrally attached to the upper structural body 3 by fastening members, such as bolts and nuts or screws, without using welding, adhesion, or the like. Thereby, when maintenance or repair are conducted for the electric automotive vehicle 1 after a user gets it, the lower structural body 2 can be separated from the upper structural body 3 as needed, so that the maintenance performance can be superior.

Herein, a radar-frame type of vehicle-body structure is known as the vehicle-body structure of the automotive vehicle. In a case of the radar-frame type of vehicle-body structure, the structure is vertically splitable into a radar frame and a cabin, wherein the radar frame continuously extends in a longitudinal direction and therefore this radar frame receives a collision load mainly in a vehicle frontal collision and a vehicle rear collision. In a vehicle side collision, the radar frame receives the collision load supplementally and the cabin receives the collision load mainly. Thus, in the radar-frame type of vehicle-body structure, it is usual that the member receiving the collision load of the vehicle frontal/rear collision is separated from the member receiving the collision load of the vehicle side collision.

Meanwhile, in the case of the electric automotive vehicle 1 of the present embodiment in which the lower structural body 2 provided with the frame members 11, 12 and the upper structural body 3 are splitable, the collision load is received by the lower structural body 2 and the upper structural body 3 both in the vehicle frontal/rear collision and in the vehicle side collision, so that the technology concept of the present embodiment is considerably different from that of the conventional radar-frame type of vehicle-body structure in dispersing the collision load to the both structural bodies 2, 3 and absorbing the collision load. Hereafter, the structure of the lower structural body 2 and the upper structural body 3 and their operational effects will be described in order.

(Lower Structural Body)

The lower structural body 2 will be described first. As shown in FIGS. 3 and 4, the lower structural body 2 comprises the powertrain PT, the front wheels F, the rear wheels R, front suspension devices 13, and rear suspension devices 14 in addition to the battery case 10, the front frames 11, and the rear frames 12. Any type of suspension is applicable to the front suspension device 13 and the rear suspension device 14.

The battery case 10 is a large-sized case which extends, below the floor panel 70 described later, from the vicinity of its left end portion to the vicinity of its right end portion and also extends from the vicinity of its front end portion to the vicinity of its rear end portion. By providing the battery case 10 in a wide range below the floor panel 70 as described above, the battery B having a large capacity can be installed to the electric automotive vehicle 1 as shown in FIG. 4. The battery B may be constituted by a lithium-ion battery, an all-solid battery, or the like, or any other secondary battery. Further, the battery B may be a so-called battery cell or a battery pack storing plural battery cells.

The battery case 10 comprises a left-side member 20, a right-side member 21, a front-end member 22, a rear-end member 23, and a bottom plate 24. The left-side member 20, the right-side member 21, the front-end member 22, and the rear-end member 23 are respectively made of an aluminum-alloy extruded member, for example, but these may be formed by pressing an aluminum-alloy made plate member or a steel plate. The bottom plate 24 can be also made of an extruded member. In the following description, the "extruded member" means the aluminum-alloy extruded member, and the "pressing member" means the aluminum-alloy made plate member or the steel plate which are formed through pressing. Moreover, each member may be made of a casting.

Each cross section, in a perpendicular direction to a longitudinal direction, of the left-side member 20, the right-side member 21, the front-end member 22, and the rear-end member 23 is configured to be rectangular. Further, the left-side member 20, the right-side member 21, the front-end member 22, and the rear-end member 23 are located at the same level and extend substantially horizontally.

The left-side member 20 is provided at a left end portion of the battery case 1 and extends in the longitudinal direction. The right-side member 21 is provided at a right end portion of the battery case 1 and extends in the longitudinal direction. Further, the front-end member 22 is provided at a front end portion of the battery case 1 and extends in the lateral direction. A left end portion of the front-end member 22 and a front end portion of the left-side member 20 are interconnected, and a right end portion of the front end member 22 and a front end portion of the right-side member 21 are interconnected. The rear-end member 23 is provided at a rear end portion of the battery case 1 and extends in the lateral direction. A left end portion of the rear-end member 23 and a rear end portion of the left-side member 20 are interconnected, and a right end portion of the rear-end member 23 and a rear end portion of the right-side member 21 are interconnected. The bottom plate 23 extends substantially horizontally and is fixed to respective lower faces of the left-side member 20, the right-side member 21, the front-end member 22, and the rear-end member 23. Accordingly, a battery storage space S (shown in FIG. 3) which stores the battery B is partitioned by the left-side member 20, the right-side member 21, the front-end member 22, the rear-end member 23, and the bottom plate 24.

The size of the battery storage space S is changeable according to the capacity of the battery B installed. The size of the battery storage space S is easily changeable by each length of the left-side member 20, the right-side member 21, the front-end member 22, and the rear-end member 23 and a shape of the bottom plate 24. For example, in a case where the vehicle is a small (compact) car with a short wheel base and a narrow tread, the size of the battery storage space S becomes small by configuring the vehicle such that the left-side member 20, the right-side member 21, the front-end member 22, and the rear-end member 23 are respectively short and the shape of the bottom plate 24 is small (see FIG. 5). In a case where the vehicle is a large car, meanwhile, by configuring the vehicle such that the left-side member 20, the right-side member 21, the front-end member 22, and the rear-end member 23 are respectively long and the shape of the bottom plate 24 is large, the size of the battery storage space S becomes large. In a case where the left-side member 20, the right-side member 21, the front-end member 22, and the rear-end member 23 are respectively made of the extruded member, their length can be changed easily. Further, the bottom plate 24 can be made of the extruded member, whereby its shape can be changed easily.

An upper side of the battery storage space S may be closed with a cover body, not illustrated, or the floor panel 70, described later. A cooling device to cool the battery B or a heating device to heat the battery B (temperature controller), except the battery B, can be provided in the battery storage space S. Further, the electric power of the battery B is supplied to the driving motor M by a controller, not illustrated. Moreover, charging of the battery B is possible by a charging socket, not illustrated.

As shown in FIG. 3, first-third battery-side cross members 25A, 25B, 25C are provided inside the battery case 10 as reinforcing members extending in the lateral direction. These members 25A, 25B, 25C have the same level which is substantially equal to the level of the left-side member 20 and the like. These members 25A, 25B, 25C may be respectively made of the extruded member or the pressing member. While the three battery-side cross members 25A, 25B, 25C are provided in the present embodiment, the number of these members is changeable according to the longitudinal dimension of the battery case 10.

The first-third battery-side cross members 25A, 25B, 25C are spaced apart from each other in the longitudinal direction, and the first battery-side cross member 25A is located at the foremost position and the third battery-side cross member 25C is located at the rearmost position. Each lower portion of these members 25A, 25B, 25C is fixed to an upper face of the bottom plate 24. Further, each left end portion of these members 25A, 25B, 25C is fixed to an inner face (right-side face) of the left-side member 20, and each right end portion of these members 25A, 25B, 25C is fixed to an inner face (left-side face) of the right-side member 21. That is, these members 25A, 25B, 25C are members which interconnect the left-side member 20 and the right-side member 21.

Figure 5:
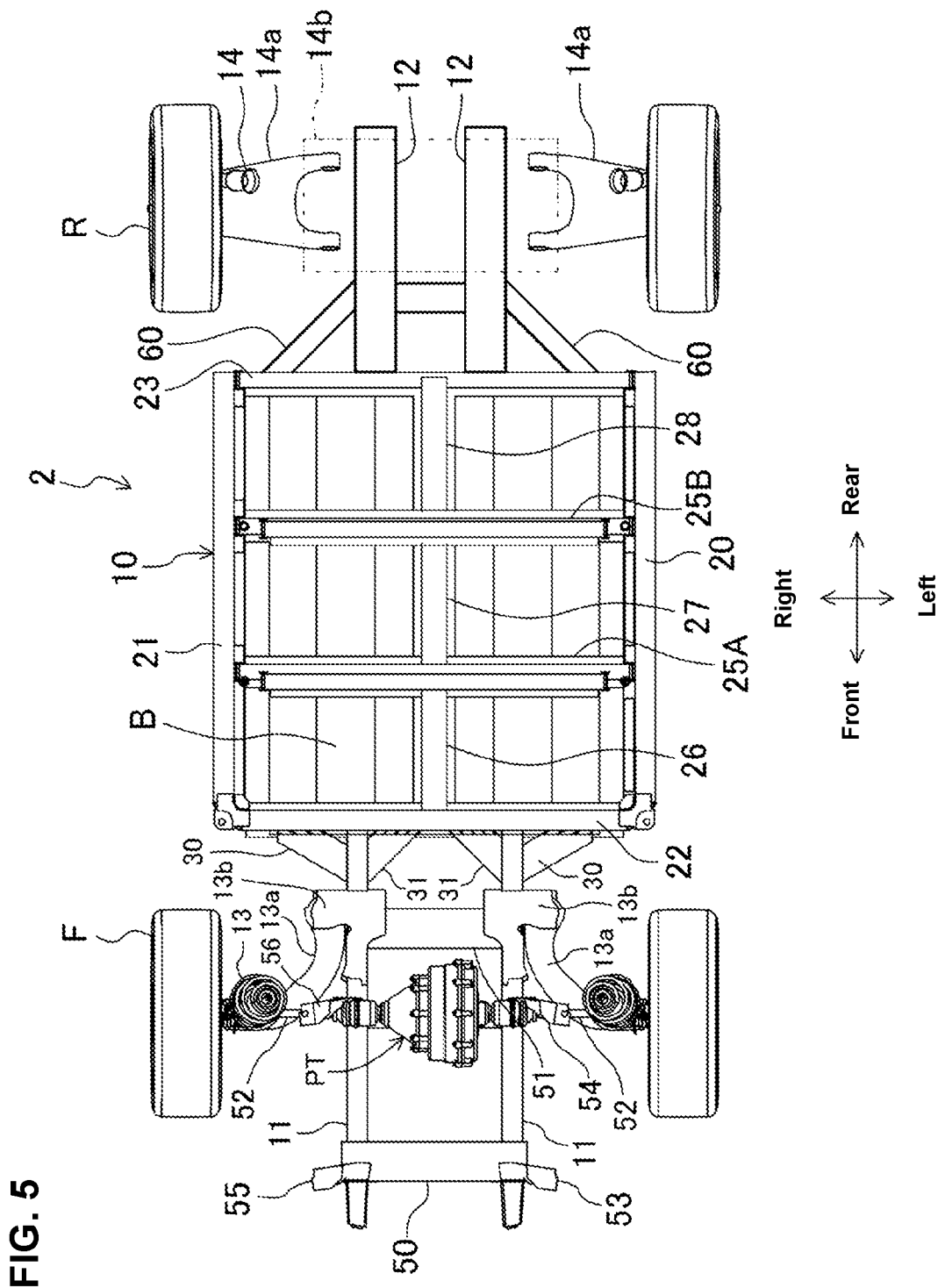
FIG. 5 is a view of the lower structural body provided with a small-sized battery case, which corresponds to FIG. 4.

While FIG. 5 shows an example of the lower structural body 2 provided with the small-sized battery case 10 which has a shorter longitudinal dimension than the battery case 10 shown in FIG. 4, illustration of the third battery-side cross member 25C is omitted because the longitudinal dimension of the example shown in FIG. 5 is short. On the contrary, a fourth battery-side cross member can be provided, which is not illustrated.

A front center member (front reinforcing member) 26 and first-third rear center members (rear reinforcing member) 27-29 are provided inside the battery case 10 as reinforcing members extending in the longitudinal direction. The front center member 26 and the first-third rear center members 27-29 have substantially the same level and are provided at the center, in the lateral direction, of the battery case 10. Each lower end portion of the front center member 26 and the first-third rear center members 27-29 is attached to the upper face of the bottom plate 24.

The front center member 26 is arranged between the front-end member 22 and the first battery-side cross member 25A, a front end portion of the front center member 26 is fixed to a central portion, in the lateral direction, of the front-end member 22, and a rear end portion of the front center member 26 is fixed to a central portion, in the lateral direction, of the first battery-side cross member 25A. Accordingly, the front-end member 22 is a member which extends so as to interconnect respective front end portions of the left-side member 20 and the right-side member 21 and a front end portion of the front center member 26.

The first rear center member 27 is arranged between the first battery-side cross member 25A and the second battery-side cross member 25B, a front end portion of the first rear center member 27 is fixed to the central portion, in the lateral direction, of the first battery-side cross member 25A, and a rear end portion of the first rear center member 27 is fixed to a central portion, in the lateral direction, of the second battery-side cross member 25B. Further, the second rear center member 28 is arranged between the second battery-side cross member 25B and the third battery-side cross member 25C, a front end portion of the second rear center member 28 is fixed to the central portion, in the lateral direction, of the second battery-side cross member 25B, and a rear end portion of the second rear center member 28 is fixed to a central portion, in the lateral direction, of the third battery-side cross member 25C. Moreover, the third rear center member 29 is arranged between the third battery-side cross member 25C and the rear end member 23, a front end portion of the third rear center member 29 is fixed to the central portion, in the lateral direction, of the third battery-side cross member 25C, and a rear end portion of the third rear center member 29 is fixed to a central portion, in the lateral direction, of the rear end member 23. Accordingly, the first-third battery-side cross members 25A, 25B, 25C and the front central member 26 and the first-third rear center members 27-29 are arranged in a latticed pattern and interconnected mutually inside the battery case 10, whereby the reinforcing effect of the battery case is further improved.

When an imaginary straight line which extends in the longitudinal direction in a plan view is considered, the front center member 26 and the first-third rear center members 27-29 are set such that they are positioned on this imaginary straight line. That is, the first-third rear center members 27-29 are positioned on part of this imaginary line which extends rearward from the front center member 26. Herein, the front center member 26 and the first-third rear center members 27-29 may constituted by a single member which is continuous in the longitudinal direction.

Figure 6:
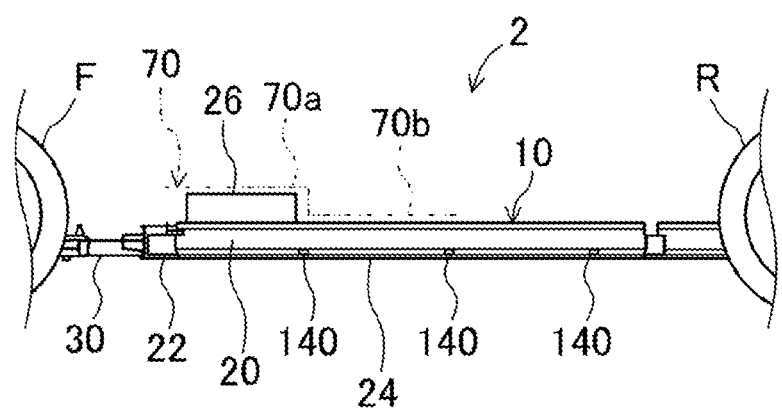
FIG. 6 is a left side view of the lower structural body in a case where the level of a front central member is high.

FIG. 6 is a diagram which shows an example where the level of the front center member 26 is higher than that of the first-third rear center members 27-29 (not illustrated in FIG. 6). The floor panel 70 of the upper structural body 3 is configured such that its front floor portion 70a is located above its rear floor portion 70b, which is specifically described later. The front center member 26 is provided below the front floor portion 70a, and the first-third rear center members 27-29 are provided below the rear floor portion 70b. An upper end portion of the front center member 26 is located above the rear floor portion 70b. In other words, respective upper end portions of the first-third rear center members 27-29 are positioned below the upper end portion of the front center member 26, which corresponds to a structure in which the rear floor portion 70b is located at a relatively low level. Herein, the first battery-side cross member 25A may be positioned below the front floor portion 70a, and in this case, an upper end portion of the first battery-side cross member 25A can be configured to be located above the second and third battery-side cross members 25B, 25C.

As shown in FIGS. 3 and 4, the front frame member 11 is provided at each side, in the vehicle width direction, of the vehicle body and extends substantially horizontally and straightly below each of right-and-left front side frames 72 which will be described later. The front frame member 11 may be made of the extruded member, the pressing member, or the like. In the present embodiment, since the front frame member 11 is made of the extruded member, its cross section perpendicular to the longitudinal direction is substantially the same over its entire length from its front end portion to its rear end portion.

The left-side front frame member 11 is connected to part of the front-end member 22 constituting the front portion of the battery case 10 which is positioned on the left side of the center, in the lateral direction, of the front-end member 22, and this connection point is positioned on the right side of the left-side member 20 of the battery case 10. Further, the right-side front frame member 11 is connected to part of the front-end member 22 which is positioned on the right side of the center, in the lateral direction, of the front-end member 22, and this connection point is positioned on the left side of the right-side member 21 of the battery case 10. Thereby, the distance between the right-and-left front frame members 11 becomes a specified distance, whereby a lower portion of the powertrain PT can be arranged between the right-and-left front frame members 11. The distance between the right-and-left front frame members 11 is set to be narrower than that between the left-side member 20 and the right-side member 21 of the battery case 10.

The right-and-left front frame members 11 have substantially the same level. Further, the right-and-left front frame members 11 and the front center member 26, the left-side member 20, and the right-side member 21 of the battery case 10 are located substantially at the same level.

Respective portions (rear sides) of the front frame members 11 which are positioned on the side of the battery case 10 are connected to the battery case 10 at plural points which are spaced apart from each other in the lateral direction. Specifically, a rear end portion of the right-side front frame member 11 is connected to the front-end member 22, and a portion of the front frame member 11 which is spaced forward from the rear end portion of the front frame member 11 is connected to the front-end member 22 by an outside connection portion (one-side connection portion) 30 and an inside connection portion (other-side connection portion) 31. Thereby, the collision load inputted to the front frame member 11 in the vehicle frontal collision can be dispersed and transmitted to plural points of the battery case 10.

The outside connection portion 30 and the inside connection portion 31 are made of the high-rigidity member, such as the extruded member or the pressing member, which have a cylindrical, plate, or columnar shape. The width of each of the outside connection portion 30 and the inside connection portion 31 is set to be wider than that of the front frame member 11 in the plan view, whereby the dispersion performance of the collision load is further improved. Herein, the width of each of the outside connection portion 30 and the inside connection portion 31 may be set to be equal to that of the front frame member 11 or narrower than that of the front frame member 11.

The right-side outside connection portion 30 is provided substantially at the same level as the front frame member 11 at the right side (the outward side in the vehicle width direction) of the right-side front frame member 11, and the right-side outside connection portion 30 is oblique in the longitudinal direction in the plan view such that its rear end portion is positioned further on the right side. A front end portion of the right-side outside connection portion 30 is connected to a portion (middle portion) of the front frame member 11 which is positioned between a center, in the longitudinal direction, of the front frame member 11 and a rear end portion of the front frame member 11. The outside connection portion 30 extends rightward and rearward from its connection portion to the front frame member 11, i.e., toward the side sill 73 (described later) of the upper structural body 3. A rear end portion of the right-side outside connection portion 30 is connected to a portion of the front-end member 22 which is spaced rightward apart from the rear end portion of the front frame member 11. A connecting structure of the outside connection portion 30 and the front frame member 11 and a connecting structure of the outside connection portion 30 and the front-end member 22 may be constituted in a connecting manner which uses fastening members, such as bolts and nuts, or welding or adhesion.

The right-side inside connection portion 31 is provided substantially at the same level as the front frame member 11 at the left side (the inward side in the vehicle width direction) of the right-side front frame member 11, and the right-side inside connection portion 30 is oblique in the longitudinal direction in the plan view such that its rear end portion is positioned further on the left side. A front end portion of the right-side inside connection portion 31 is connected to a portion (middle portion) of the front frame member 11 which is positioned between a center, in the longitudinal direction, of the front frame member 11 and a rear end portion of the front frame member 11. The inside connection portion 31 extends leftward and rearward from its connection portion to the front frame member 11, i.e., toward the center, in the lateral direction, of the battery case 73. A rear end portion of the inside connection portion 31 is connected to a portion of the front-end member 22 which is spaced leftward apart from the rear end portion of the front frame member 11. A connecting structure of the inside connection portion 31 and the front frame member 11 and a connecting structure of the inside connection portion 31 and the front-end member 22 can be constituted in the same manner as the connecting structure of the outside connection portion 30.

While the right-side front frame member 11 is connected to the front-end member 22 at three points which are spaced apart from each other in the lateral direction in the present embodiment, two-point connection may be applied by omitting either one of the outside connection portion 30 and the inside connection portion 31 or only the outside connection portion 30 and the inside connection portion 31 may be connected to the front-end member 22 without connecting the rear end portion of the front fame member 11 to the front-end member 22.

Herein, the left-side front frame member 11 can be connected to the front-end member 22 similarly to the right-side front frame member 11. The connecting structure of the left-side front frame member 11 can be a laterally-symmetrical structure relative to the right-side front frame member 11.

As shown in FIG. 3, a middle connecting member 49, a front connecting member 50, and a rear connecting member 51 are provided to be spaced apart from each other in the longitudinal direction. The front connecting member 50 extends in the vehicle width direction from a front portion of the left-side front frame member 11 to a front portion of the right-side front frame member 11 and interconnects the left-side front frame member 11 and the right-side front frame member 11. Further, the rear connecting member 51 extends in the vehicle width direction from a rear portion of the left-side front frame member 11 to a rear portion of the right-side front frame member 11 and interconnects the left-side front frame member 11 and the right-side front frame member 11. The front connecting member 50 and the rear connecting member 51 are made of the extruded member or the pressing member, for example. The right-and-left front frame members 11 are interconnected by the front connecting member 50 and the rear connecting member 51, which forms a frame structure when viewed in the plan view.

Further, the middle connecting member 49 is provided between the front connecting member 50 and the rear connecting member 51 and extends from the front portion of the left-side front frame member 11 to the front portion of the right-side front frame member 11, which interconnects the left-side front frame member 11 and the right-side front frame member 11. The middle connecting member 49 may be omitted as needed.

The front connecting member 50 extends from an upper face of the left-side front frame member 11 to an upper face of the right-side frame member 11 and protrudes upward from the respective upper faces of these front frame members. Meanwhile, the rear connecting member 51 is arranged between the right-and-left front frame members 11, and its left end portion is connected to a side face of the left-side front frame member 11 and its right end portion is connected to a side face of the right-side front frame member 11. The front connecting member 50 and the rear connecting member 51 may be fixed to the front frame member 11 by fastening, welding, or adhesion.

The longitudinal dimension of each of the front connecting member 50 and the rear connecting member 51 is set to be longer than the lateral dimension of the front frame member 11. Thereby, the connection strength of the front frame member 11 by means of the both connecting members 50, 51 can be increased.

As shown in FIG. 4, the powertrain PT is arranged in back of the front connecting member 50. Specifically, the powertrain PT is arranged between the front connecting member 50 and the rear connecting member 51 in the plan view. A pair of driveshafts 52 to transmit an output of the powertrain PT to the right-and-left front wheels F are provided on both sides of the lower structural body 2.

Further, a pair of suspension arms 13a to constitute part of the front-side suspension device 13 are pivotally supported at the right-and-left front frame members 11 via a pair of brackets 13b. The bracket 13b is provided at a connection portion of the front frame member 11 and the rear connecting member 51.

At the lower structural body 2, two left-side connection portions 53, 54 to connect the left-side front frame member 11 to the left-side front side frame 72 (described later) are provided to be spaced apart from each other in the longitudinal direction, and two right-side connection portions 55, 56 to connect the right-side front frame member 11 to the right-side front side frame 72 (described later) are provided to be spaced apart from each other in the longitudinal direction. These connection portions 53, 54, 55, 56 can be made of a plate member, a cylindrical member, a columnar member, or the like which extend in the vertical direction. These are made of the pressing member in the present embodiment, but these may be made of the pressing member or the like. Further, the number of the left-side connection portions 53, 54 is not limited to two, and three or more connection portions may be provided to be spaced apart from each other in the longitudinal direction. The right-side connection portions 55, 56 are similar to the left-side connection portions 53, 54.

The front left-side connection portion 53 is provided at a connection portion of the front connecting member 50 to the left-side front frame member 11. Specifically, the front portion of the left-side front frame member 11 and the left end portion of the front connecting member 50 are provided to overlap each other in the vertical direction, and the left end portion of the front connecting member 50 is connected to the front portion of the left-side front frame member 11. Accordingly, the above-described connection portion is constituted by the left end portion of the front connecting member 50. A lower end portion of the left-side connection portion 53 is attached to the left end portion of the front connecting member 50.

Further, the front right-side connection portion 55 is provided at a connection portion of the front connecting member 50 to the right-side front frame member 11. Specifically, the front portion of the right-side front frame member 11 and the right end portion of the front connecting member 50 are provided to overlap each other in the vertical direction, and the right end portion of the front connecting member 50 is connected to the front portion of the right-side front frame member 11. Accordingly, the above-described connection portion is constituted by the right end portion of the front connecting member 50. A lower end portion of the right-side connection portion 53 is attached to the right end portion of the front connecting member 50.

The rear left-side connection portion 54 is provided at a connection portion of the left-side front frame 11 to the middle connecting member 49. A lower end portion of the rear-side left-side connection portion 54 is attached to the left-side front frame member 11 and arranged in back of the left-side driveshaft 52. Likewise, the rear-side right-side connection portion 56 is provided at a connection portion of the right-side front frame 11 to the middle connecting member 49. A lower end portion of the rear-side right-side connection portion 56 is attached to the right-side front frame member 11 and arranged in back of the right-side driveshaft 52. Thereby, the distance between the front-and-rear left-side connection portions 53, 54 and the distance between the right-side connection portions 55, 56 can be enlarged.

Figure 8:
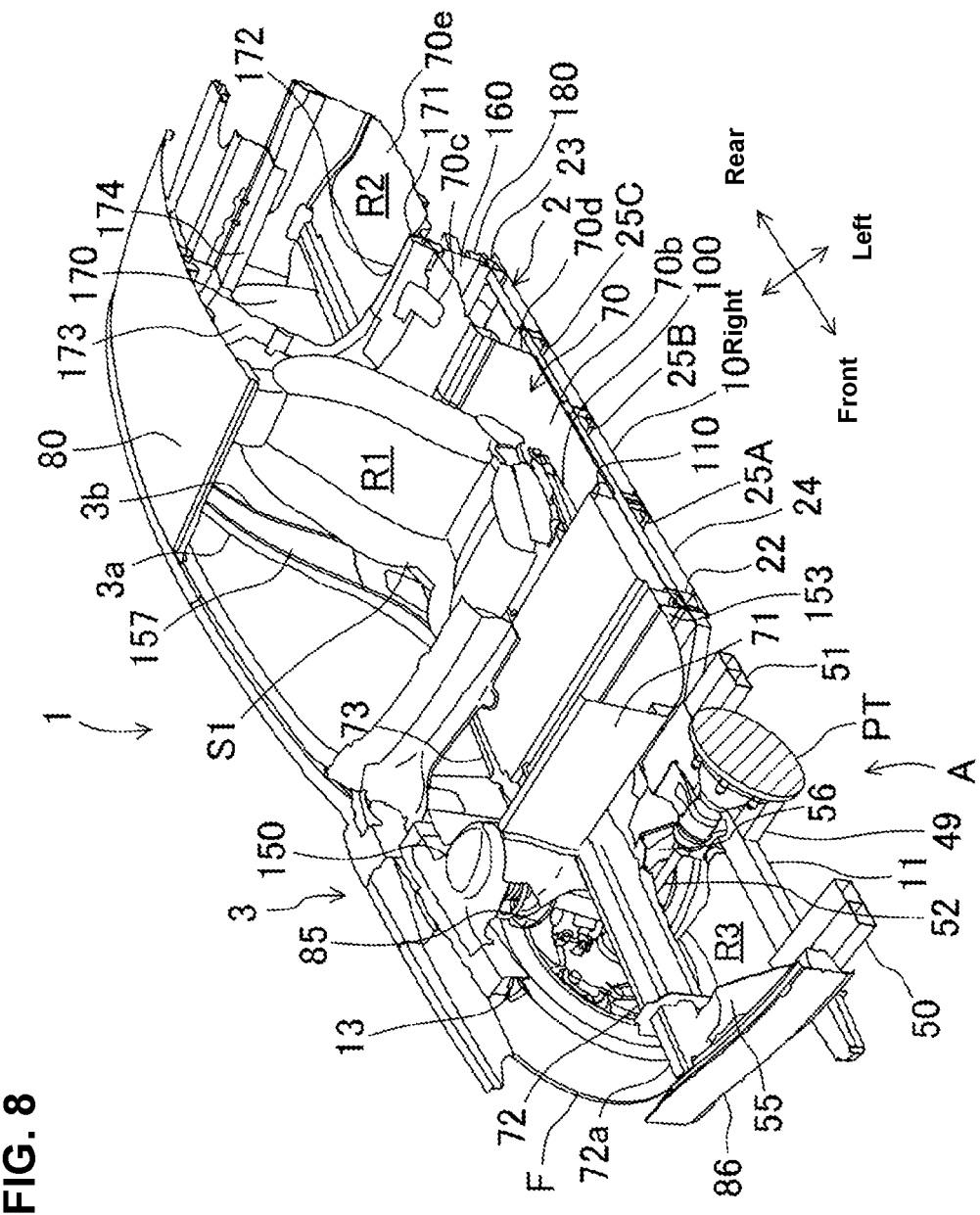
FIG. 8 is a sectional view of the electric automotive vehicle, when viewed from a vehicle front side.

The right-side front frame member 11 is arranged on the left side (the inward side in the vehicle width direction) of the right-side front side frame 72 shown in FIG. 8, and the left-side front frame member 11 is arranged on the right side (the inward side in the vehicle width direction) of the left-side front side frame 72 shown in FIG. 2. Thereby, the distance between the left-and-right front side frames 72 becomes wider than the distance between the right-and-left front frame members 11. The powertrain PT including the driving motor M is installed between the left-and-right front side frames 72.

As shown in FIG. 3, the right-side connection portions 55, 56 are configured in an oblique shape such that their upper sides are positioned at the right side (the outward side in the vehicle width direction). This is because the right-side front side frame 72 is positioned on the right side of the front frame member 11 above the right-side front frame member 11. Likewise, the left-side connection portions 53, 54 are configured in the oblique shape such that their upper sides are positioned at the left side (the outward side in the vehicle width direction).

A pair of right-and-left rear frame members 12 are provided similarly to the front frame members 11 and extend reward substantially horizontally and straightly. The rear frame member 12 can be made of the extruded member, the pressing member, or the like. In the present embodiment, it is made of the extruded member.

The left-side rear frame member 12 is connected to a portion of the rear-end member 23 which constitutes a rear part of the battery case 10 which is positioned on the left side of a center, in the lateral direction, of the rear-end member 23, and this connection portion is located on the right side of the left-side member 20 of the battery case 10. The right-side rear frame member 12 is connected to a portion of the rear-end member 23 which is positioned on the right side of the center, in the lateral direction, of the rear-end member 23, and this connection portion is located on the left side of the right-side member 21 of the battery case 10. The connection structure of the rear frame member 12 to the rear-end member 23 can be similar to the above-described connection structure of the front frame member 11 to the front-end member 22.

Further, in the embodiment shown in FIG. 5, the front end portions of the right-and-left rear frame members 12 are connected to the rear-end member 23, and a middle portion, in the longitudinal direction, of each of the rear frame members 12 is connected to the rear-end member 23 by a connecting member 60. Thereby, part of the rear frame member 12 which is positioned on the side of the battery case is connected to the battery case 10 at plural points which are spaced apart from each other in the lateral direction.

Each of the right-and-left suspension arms 14a which constitutes part of the rear suspension device 14 is pivotally supported at each of the right-and-left rear frame members 12.

(Upper Structural Body)

Next, the upper structural body 3 will be described. As shown in FIGS. 7-10, the upper structural body 3 comprises the floor panel 70, a dash panel 71, a pair of right-and-left front side frames 72, and a pair of right-and-left side sills 73. FIGS. 7-10 show a state where the doors, the bonnet hood, the front fender, the widow glass, the bumper, the front-and-rear lights, part of the seats, interior members, and others are removed.

The floor panel 70 constitutes a floor face of the cabin R1, which is made of a steel plate or the like which extends in the longitudinal direction and in the lateral direction. A space above the floor panel 70 is the cabin R1. A roof 80 is provided at an upper side of the cabin R1. As shown in FIG. 2, a front opening portion 3*a* and a rear opening portion 3*b* are formed at a left-side part of the upper structural body 3. As shown in FIG. 1, the front opening portion 3*a* and the rear opening portion 3*b* are configured to be opened or closed by means of a front door 81 and a rear door 82. Another front door and another rear door are arranged at a right-side part of the upper structural body 3 as well, not illustrated.

Figure 7:
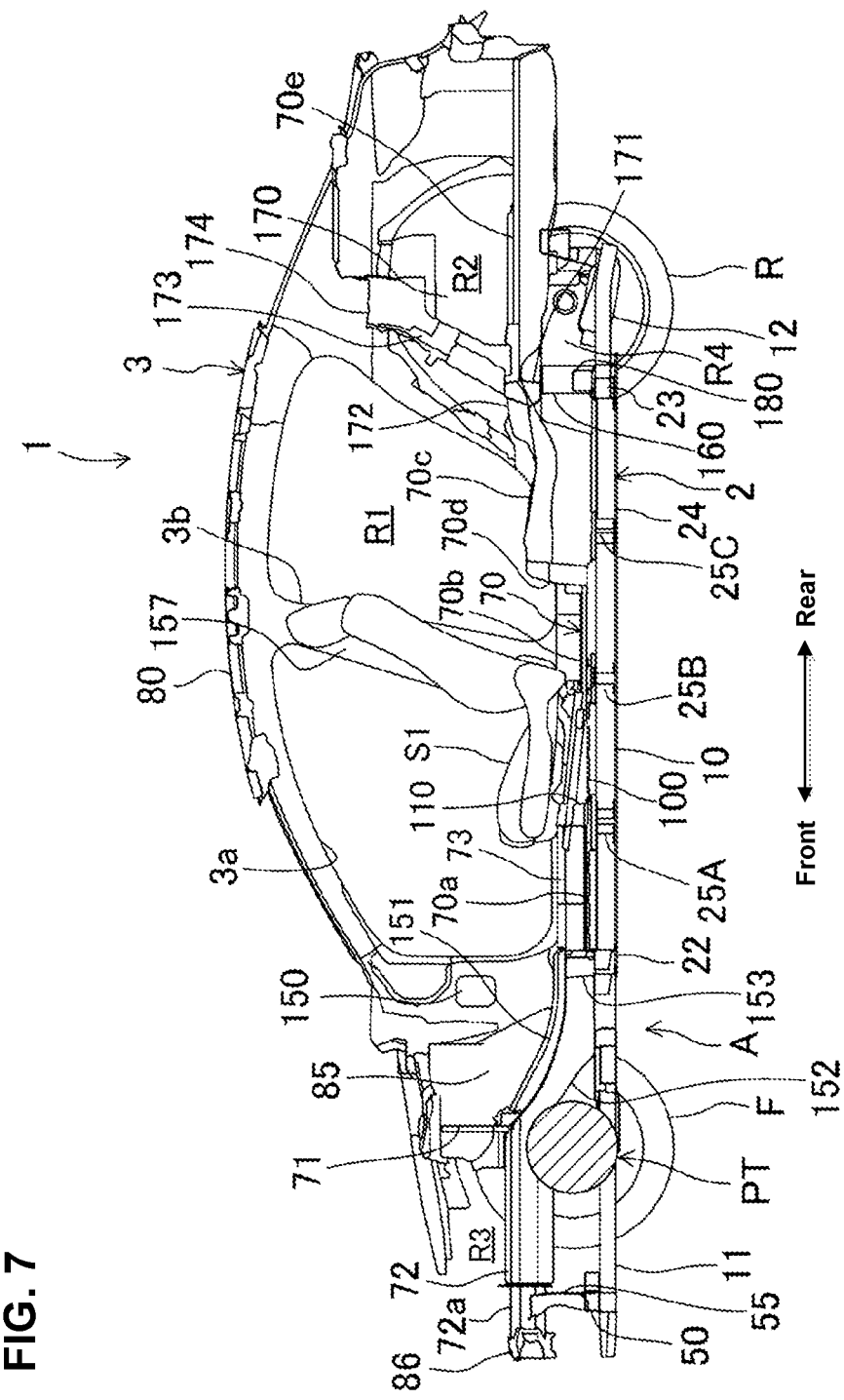
FIG. 7 is a sectional view of a central portion, in a lateral direction, of the electric automotive vehicle.
Figure 9:
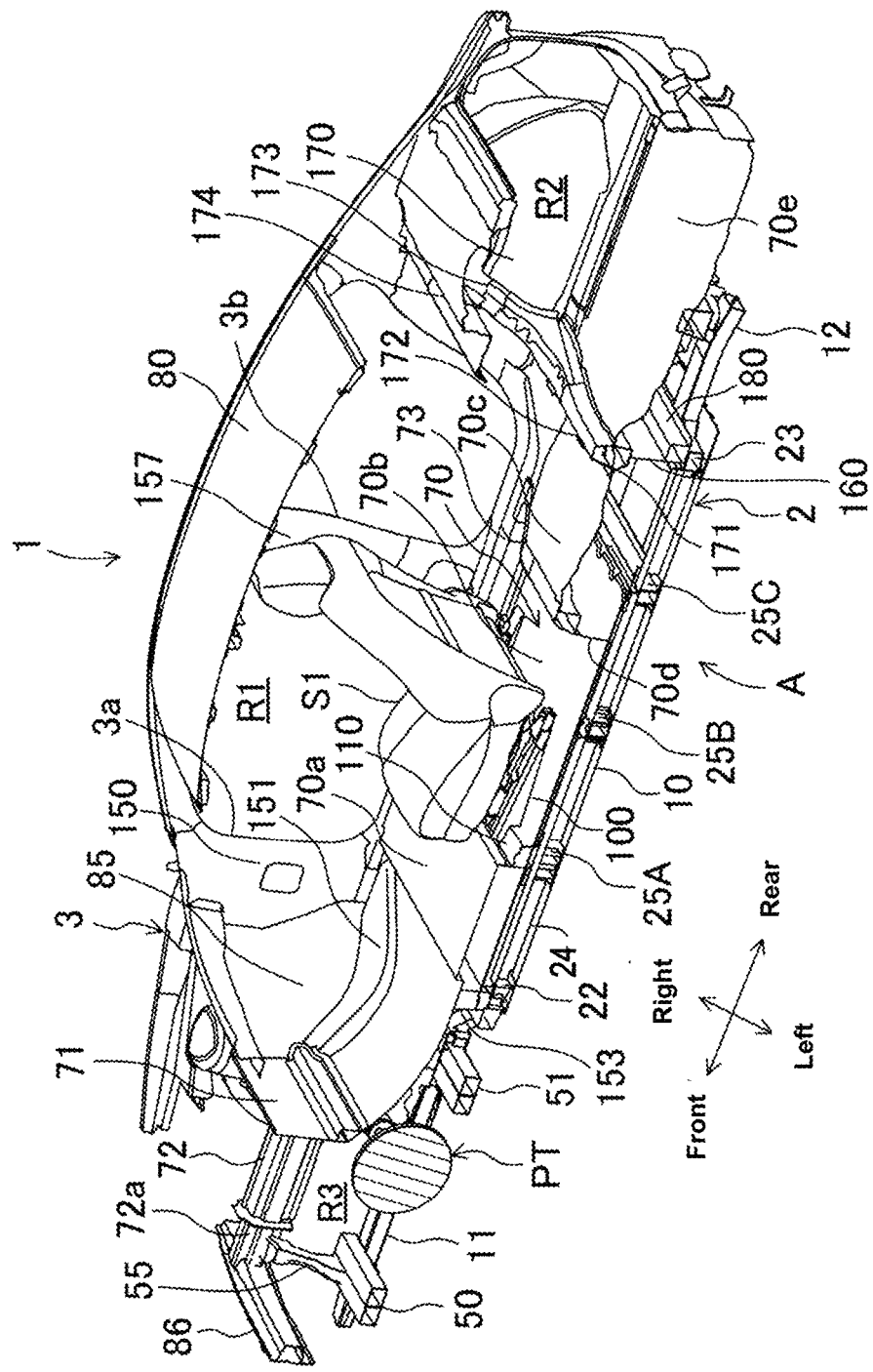
FIG. 9 is a sectional view of the electric automotive vehicle, when viewed from a vehicle rear side.

The dash panel 71 is a member which partitions the power room R3 from the cabin R1 in the longitudinal direction. The dash panel 71 is made of a steel plate, for example, and extends in the lateral direction and in the vertical direction. As shown in FIGS. 7-9, a pair of front wheelhouses 85 (only the right-side one is illustrated in these figures) which accommodate the right-and-left front wheels F are provided at right-and-left both sides of a front part of the upper structural body 3. A left end portion of the dash panel 71 is connected to the left-side front wheelhouse portion 85 (shown in FIG. 2), and a right end portion of the dash panel 71 is connected to the right-side front wheelhouse portion 85 (shown in FIGS. 7-9).

Figure 10:
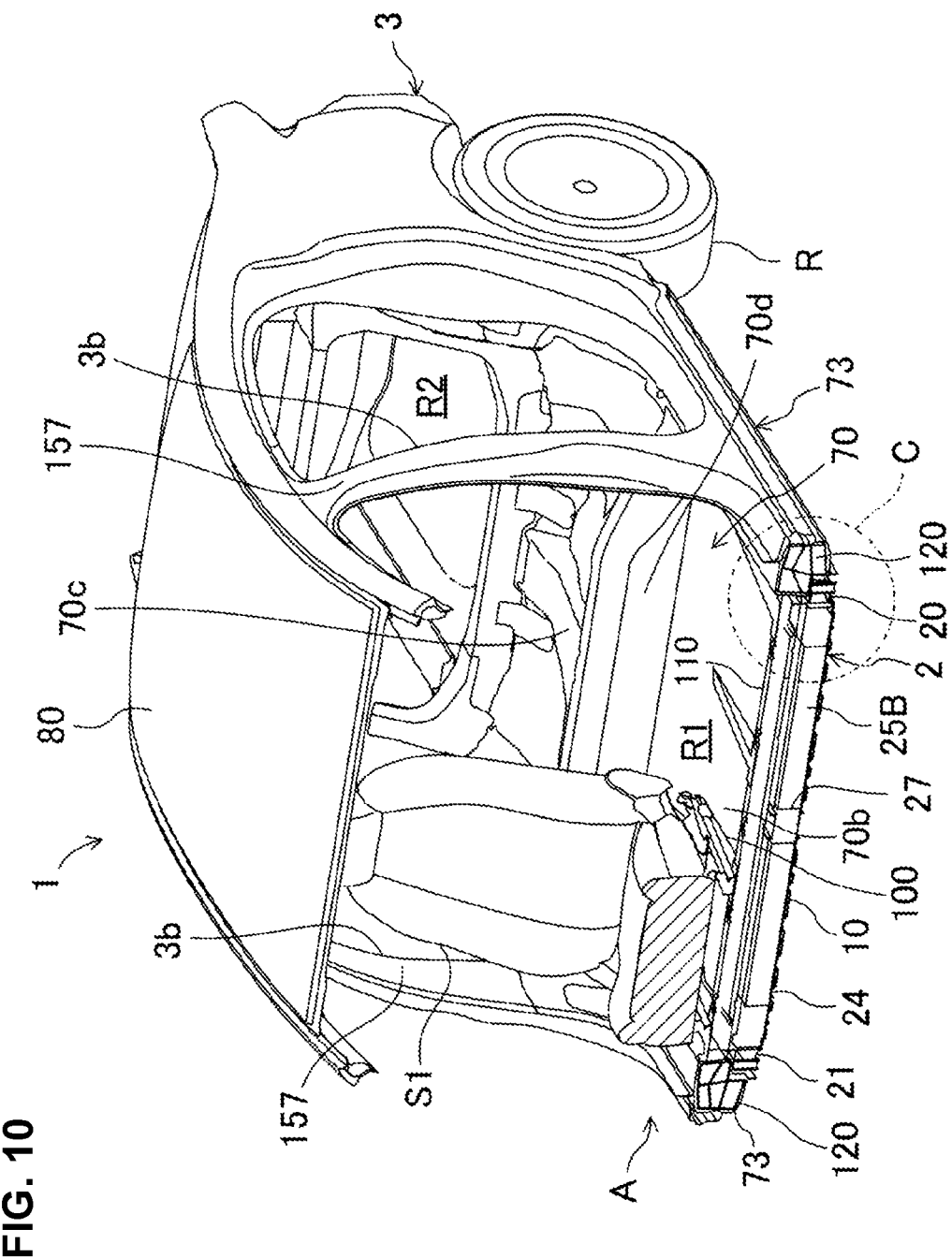
FIG. 10 is a perspective view of the electric automotive vehicle, when viewed from the vehicle front side, which shows its section passing through a front-seat portion.
Figure 11:
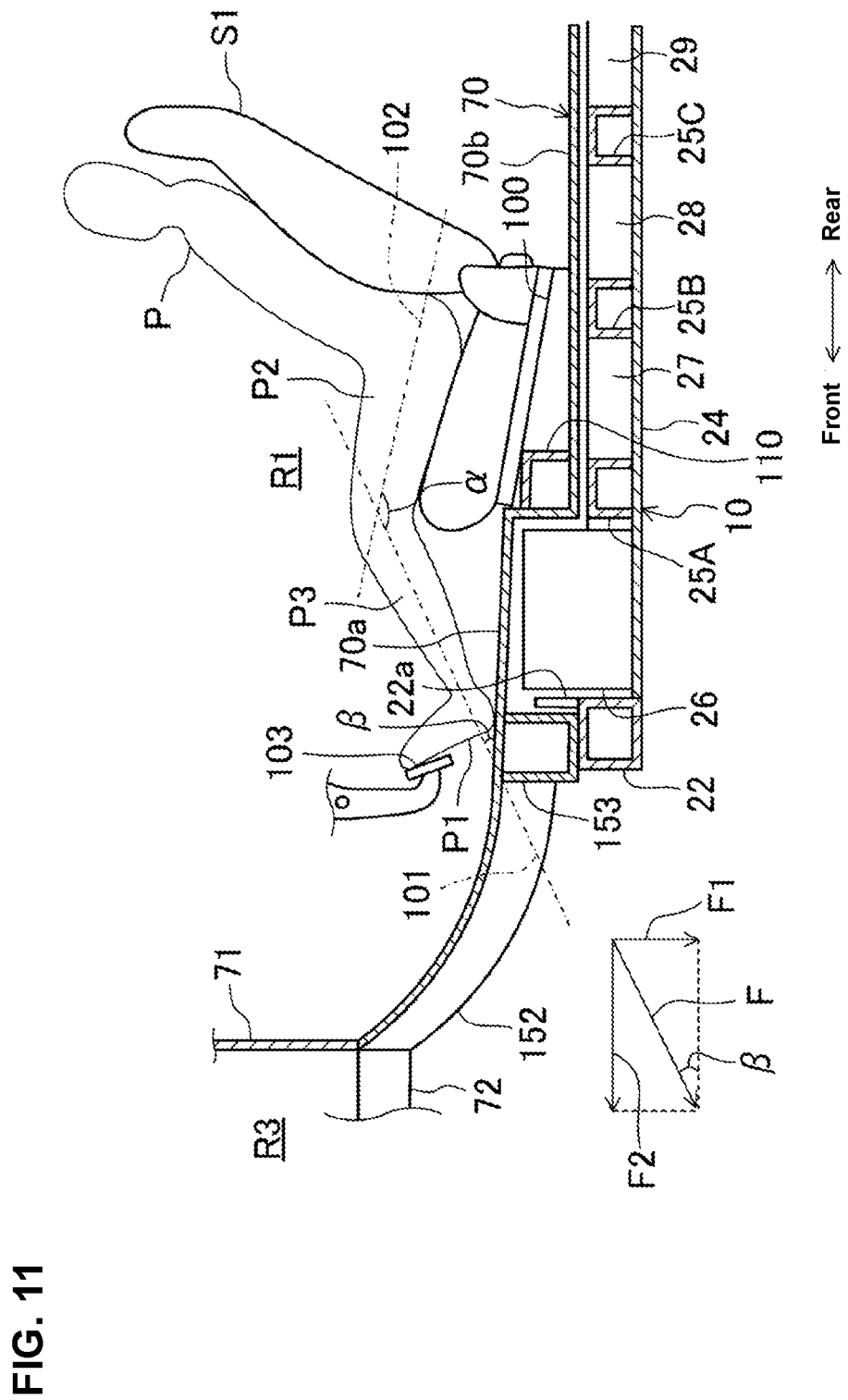
FIG. 11 is a diagram schematically showing a floor panel, a front seat, a front-seat passenger, and a battery unit.

As shown schematically in FIG. 11, the floor panel 70 comprises a front floor portion 70*a* and a rear floor portion 70*b*. As shown in FIG. 10, the floor panel 70 further comprises a kickup portion 70*c* at its rear part. The front floor portion 70*a*, the rear floor portion 70*b*, and the kickup portion 70*c* may be made of a single plate member or separated plate members. In a case of the separated members, the single-sheet of floor panel 70 can be formed by welding the plural plate members.

As shown in FIG. 11, the front floor portion 70*a* constitutes a front-side part of the floor panel 70, which is inclined or curved such that its front side is located upward. A front end portion of the front floor portion 70*a* is connected to a lower end portion of the dash panel 71. Accordingly, the floor panel 70 is provided to extend rearward from a lower end portion of the dash panel 71.

The rear floor portion 70*b* is configured to extend rearward from a rear end portion of the front floor portion 70*a*, which constitutes a middle part, in the longitudinal direction, of the floor panel 70. The front portion of the battery case 10 of the lower structural body 2 is positioned just below the front floor portion 70*a*, and the rear portion of the battery case 10 is positioned just below the front floor portion 70*a*. Accordingly, the battery case 10 is configured to extend from a position located below the front floor portion 70*a* to another position located below the rear floor portion 70*b*, whereby the battery B can be installed in a mostly wide area below the floor panel 70.

A middle portion, in the longitudinal direction, of the floor panel 70 is located at a lower level than the front floor portion 70*a*. That is, the front floor portion 70*a* is provided in the front side of the rear floor portion 70*b* and located at a higher level than the rear floor portion 70*b*. At least part of a seat fixation portion 100 to fix the front seat S1 is attached to a front-side portion of the rear floor portion 70*b*. The seat fixation portion 100 is constituted by a bracket, for example. Herein, whole part of the seat fixation portion 100 may be attached to the rear floor portion 70*b* as long as at least a rear portion of the seat fixation portion 100 is attached to the rear floor portion 70*b*. Since the front seat S1 can be disposed at a lower level by attaching at least the rear portion of the seat fixation portion 100 to the rear floor portion 70*b*, a hip point of a front-seat passenger P can be lowered, so that there occurs a sufficient space above a head of the front-seat passenger, thereby improving the residential performance. Further, lowering of the hip point means that a sitting position of the front-seat passenger P becomes low, so that the level of the gravity center of the vehicle when the passenger is in the vehicle is lowered. In the present embodiment, since the whole part of the seat fixation portion 100 is attached to the rear floor portion 70, the front seat S1 can be located at the further lower level.

When a driver as the front-seat passenger P is seated at the front seat S1, a heel P1 of the front-seat passenger P is placed on the front floor portion 70*a*. Since the front floor portion 70*a* where the heel P1 is placed is located at the higher level than the rear floor portion 70*b*, the position of the heel P1 is located at a higher level compared to an operational position of a general automotive vehicle (in which the front floor portion and the rear floor portion are located at the same level). This layout makes a position where an upper leg P2 and a lower leg P3 form a wide open angle. In FIG. 11, reference character 101 denotes a center line of the upper leg P2, reference character 102 denotes a center line of the lower leg P3, and the difference in level between the front floor portion 70*a* and the rear floor portion 70*b* is set so that an angle between the center line 101 and the center line 102 (an opening angle α between the upper leg P2 and the lower leg P3) can fall within a range of 125-150°.

Since the angle between the lower leg P3 and the front floor portion 70*a* (an angle β between the center line 101 and the front floor portion 70*a*) becomes small by setting the level deference described above, a component force, in the vertical direction, of an inputted force to the heel P1 in a pedal operation becomes small, thereby improving the operability of a brake pedal 103. Specifically, when the front-seat passenger P presses down the brake pedal 103, the heel P1 applies an obliquely-downward force F to the front floor portion 70*a*. If this force F is divided into a vertical-direction force and a horizontal-direction force, they becomes a force F1 and a force F2. Herein, since the angle β is small as described above, the vertical-direction force F1 inputted from the heel P1 becomes small. Thereby, for example, a pedal-pressing change operation from the brake pedal 103 to an accelerator pedal (not illustrated) or its reverse operation become so quick and accurate that the pedal operability can be improved.

Further, there is a case where a foot (feet) of a rear-seat passenger is placed on the rear floor portion 70*b*. Since the rear floor portion 70*b* is located at the lower level than the front floor portion 70*a*, a foot space of the rear-seat passenger is enlarged, thereby improving the residential performance.

As shown in FIGS. 7-9, the kickup portion 70*c* constitutes a rear-side part of the floor panel 70 and is connected to a rear end portion of the rear floor portion 70*b*. The kickup portion 70*c* is located at the higher level than the rear floor portion 70*b*, and a vertical plate portion 70*d* which extends in the vertical direction is provided between the kickup portion 70*c* and the rear floor portion 70*b*. The level of the kickup portion 70*c* is set to be higher than that of the front floor portion 70a. A rear seat S2 (shown in FIG. 2) is attached onto an upper face of the kickup portion 70c. The battery B or a controller (not illustrated) or the like of the electric automotive vehicle 1 may be arranged below the kickup portion 70c.

A floor-side cross member 110 which extends in the lateral direction along the floor panel 70 is attached to the floor panel 70. The floor-side cross member 110 is welded to the upper face of the rear floor panel 70b of the floor panel 70, for example. A shape of the floor-side cross member 110 is not limited to a particular shape. In the present embodiment, this member 10 is configured such that it protrudes upward with its lower side opened and has a cross section whose shape is mostly similar over a whole length, in the vehicle width direction, thereof. By attaching the floor-side cross member 110 to the rear floor portion 70b, a closed-cross section is formed by the floor-side cross member 110 and the rear floor portion 70b. A left end portion of the floor-side cross member 110 is positioned near the inner face, in the vehicle width direction, of the left-side side sill 73, and a right end portion of the floor-side cross member 110 is positioned near the inner face, in the vehicle width direction, of the right-side side sill 73. Herein, the floor-side cross member 110 may be attached to a lower face of the rear floor portion 70b.

As shown in FIGS. 7-9, the right-and-left front side frames 72 are arranged at a vehicle-body front part, which are vehicle high-strength members extending in the longitudinal direction. FIGS. 7-9 show only the right-side front side frame 72, and FIG. 2 shows the left-side front side frame 72. That is, the right-and-left front side frames 72 are positioned in front of the floor panel 70 and located at the higher level than the floor panel 70, and specifically, these front side frames 72 are provided to extend forward from right-and-left both sides of a lower portion of the dash panel 71.

The right-and-left front side frame 72 are arranged symmetrically in the lateral direction, which can be made of plural pressing members joined together or the extruded member. Each cross section, in a direction perpendicular to the longitudinal direction of the front side frame 72, of the front side frames 72 is set to be larger than that of the front frame members 11 of the lower structural body 2. Thereby, the front side frames 72 become the high-strength members compared to the front frame members 11.

A crash can 72a, which is configured to have compressive deformation in the vehicle frontal collision so as to absorb collision energy, is attached to each front end portion of the right-and-left front side frames 72. The crash can 72a is a cylindrical-shaped metal-made member which is configured to extend in the longitudinal direction. A front bumper reinforcement 86 extending in the lateral direction is fixed to respective front ends of the right-and-left crash cans 72a.

As shown in FIG. 8, an upper portion of the right-side connection portion 55 which is positioned at a front side of the lower structural body 2 is connected to the right-side crash can 72a. Further, an upper portion of the left-side connection portion 53 (shown in FIG. 2) which is positioned at the front side of the lower structural body 2 is connected to the left-side crash can 72a. Since the crash can 72a is provided at the front end portion of the front side frame 72, a connection point of the left-side connection portion 53 can be provided near a front end of the vehicle body by connecting the upper portion of the left-side connection portion 53 to the crash can 72a. Thereby, the longitudinal distance between the left-side connection portions 53, 54 can be enlarged, so that the operational effect of connecting the front frame member 11 to the front side frame 72 by the left-side connection portions 53, 54 can be further improved. This situation is the same for the right-side connection portions 55, 56. Each connection structure of the left-side connection portions 53, 54 and the right-side connection portions 55, 56 to the floor side frames 72 is the one using fastening members, such as bolts and nuts, for example. Herein, the front left-side connection portion 53 and the front right-side connection portion 55 may be connected to respective portions of the front side frames 72 which are positioned in back of the crash cans 72a.

Further, as shown in FIG. 5, a lower portion of the rear right-side connection portion 56 is connected to the front frame member 11 at a point located in back of the driveshaft 52. Further, as shown in FIG. 8, an upper portion of the rear right-side connection portion 56 is connected to a point of the front side frame 72 which is positioned slightly rearward from a center, in the longitudinal direction, of the front side frame 72. Thereby, the longitudinal distance between the right-side connection portions 55, 56 can be further enlarged. This situation is the same for the left-side connection portions 53, 54.

Figure 12:
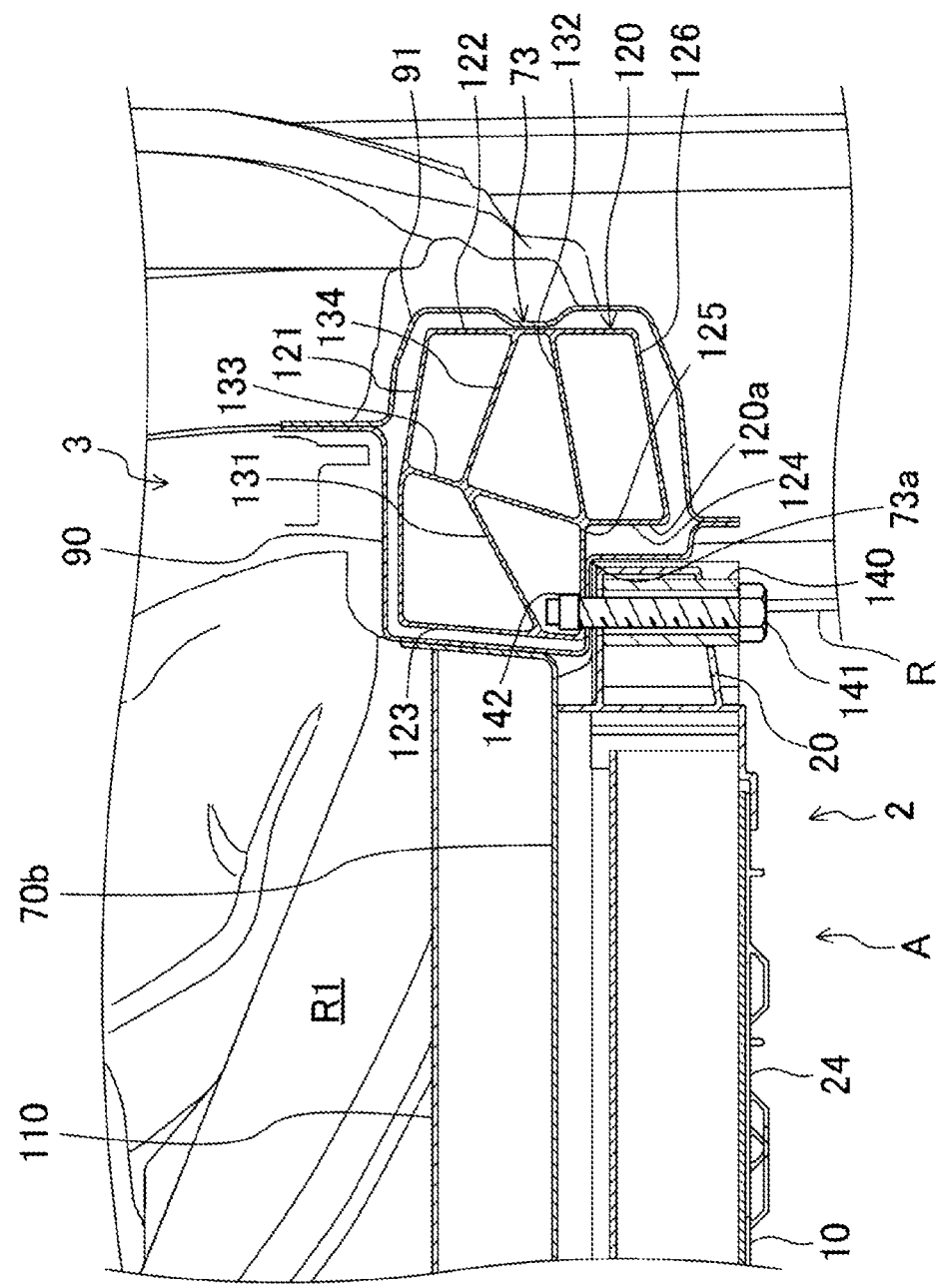
FIG. 12 is an enlarged view of a C portion in FIG. 10, when viewed from the vehicle front side.

The right-and-left side sills 73 are provided to extend in the longitudinal direction at the right-and-left both end portions of the floor panel 70. As shown in FIG. 12, a left end portion of the floor panel 70 is a central portion, in the vertical direction, of the left-side side sill 73, an upper-side portion of the side sill 73 protrudes upward from a connection portion of the floor panel 70 and a lower-side portion of the side sill 73 protrudes downward from a connection portion of the floor panel 70. Since the battery case 10 is arranged below the floor panel 70, a lower-side portion of the side sill 73 and the battery case 10 are provided to overlap each other in the vehicle side view. Likewise, the right-side side sill 73 is connected to a right end portion of the floor panel 70.

The right-and-left side sills 73 are symmetrical laterally. Hereafter, the specific structure of the left-side side sill 73 will be described referring to FIG. 12. The left-side side sill 73 comprises an inner member 90 and an outer member 91 which are made of the pressing member, respectively. The inner member 90 is a member which constitutes a cabin-inside portion of the side sill 73, which is configured to protrude toward a cabin inside and extend in the longitudinal direction. The outer member 91 is a member which constitutes a cabin-outside portion of the side sill 73, which is configured to protrude toward a cabin outside and extend in the longitudinal direction. Respective upper portions of the inner member 90 and the outer member 91 are joined, and respective lower portions of the inner member 90 and the outer member 91 are joined, whereby the side sill 73 having an hollow inside are formed.

A first recess portion 73a which is recessed outward, in the vehicle width direction, is provided to extend longitudinally at a lower portion of an inside, in the vehicle width direction, of the side sill 73. The first recess portion 73a is opened downward and inward, in the vehicle width direction. An outward side, in the vehicle width direction, of the battery case 10 of the lower structural body 2 is configured to be fitted into the first recess portion 73a. Specifically, the left-side member 20 of the battery case 10 is configured to be inserted into the first recess portion 73a from below the first recess portion 73a. Thereby, the dimension, in the vehicle width direction, of the battery case 10 can be made sufficiently long and also the downward-projection quantity of the battery case 10 can be made properly small.

Inside the side sill 73 is provided a hollow-shaped side load-transmitting member 120 which extends in the longitudinal direction and transmits the load applied to the vehicle-inward side from the vehicle-outward side toward the vehicle-inward side. Herein, the load transmitted by the side load-transmitting member 120 is considered as the one which is large enough to cause deformation of the vehicle-side member of the electric automotive vehicle 1 in the vehicle side collision in which an obstacle hits against the vehicle 1 from the vehicle side.

The side load-transmitting member 120 which can be made of the extruded member, for example, which is continuous from a front end portion of the side sill 73 to a rear end portion of the side sill 73. The side load-transmitting member 120 is fixed to the side sill 73 at an appropriate point. The fixation structure of the side load-transmitting member 120 to the side sill 73 is not limited but the structure using fastening members, such as bolt and nut or rivet, is applicable.

Since the side load-transmitting member 120 has the high rigidity so as to transmit the load toward the vehicle-inward side in the vehicle side collision, this member 120 is resistant against not only a compressive force but a bending force and a tortional force, and therefore this member 120 also serves as a reinforcing member to reinforce the side sill 73 and improve the vehicle-body rigidity during normal vehicle-traveling. Thus, since the side load-transmitting member 120 reinforces the side sill 73 inside the side sill 73, this member 120 can be called an inner reinforcement.

The side load-transmitting member 120 comprises an upper wall portion 121, an outside wall portion 122, an inside upper vertical wall portion 123, an inside lower vertical wall portion 124, a middle wall portion 125, and a lower wall portion 126. The upper wall portion 121 extends in the vehicle width direction and is arranged near an upper end portion inside the side sill 73. The outside wall portion 122 extends downward from an outer end portion, in the vehicle width direction, of the upper wall portion 121 and is arranged near an outer end portion, in the vehicle width direction, inside the side sill 73. An upper end portion of the outside wall portion 122 is located at a higher level than an upper end portion of the floor-side cross member 110. A lower end portion of the outside wall portion 122 is located at a lower level than an upper end portion of the second battery-side cross member 25B which is provided inside the battery case 10. Herein, the positional relationship between the first battery-side cross member 25A and the third battery-side cross member 25C and the side load-transmitting member 120 is substantially the same as well, which is not illustrated.

The inside upper vertical wall portion 123 extends downward from an inner end portion, in the vehicle width direction, of the upper wall portion 121 and is arranged near an inner end portion, in the vehicle width direction, inside the side sill 73. An upper end portion of the inside upper vertical wall portion 123 is located at a higher level than the upper end portion of the floor-side cross member 110. A lower end portion of the inside upper vertical wall portion 123 is located at a lower level than the rear floor portion 70b and at an upper level than the upper end portion of the second battery-side cross member 25B.

The middle wall portion 125 extends outward, in the vehicle width direction, from the lower end portion of the inside upper vertical wall portion 123. An outer end portion, in the vehicle width direction, of the middle wall portion 125 is positioned slightly on an inward side of a center, in the vehicle width direction, of the upper wall portion 121. The inside lower vertical wall portion 124 extends downward from an inner end portion, in the vehicle width direction, of the middle wall portion 125. A lower end portion of the inside lower vertical wall portion 124 is located at a lower level than the upper end portion of the second battery-side cross member 25B. The vertical dimension of the inside lower vertical wall portion 124 is set to be shorter than that of the inside upper vertical wall portion 123.

A second recess portion 120a which is recessed outward, in the vehicle width direction, is formed at a lower portion of a cabin-inside of the side load-transmitting member 120 by the inside lower vertical wall portion 124 and the middle wall portion 125 such that it corresponds to the above-described first recess portion 73a of the side sill 73. The portion of the side sill 73 where the first recess portion 73a is formed is configured to be fitted into the second recess portion 120a of the side load-transmitting member 120.

The lower wall portion 126 extends from the lower end portion of the inside lower vertical wall portion 124 to the lower end portion of the outside wall portion 122. The vehicle-width-direction dimension of the lower wall portion 126 is set to be longer than that of the middle wall portion 125.

In the vehicle side view, an upper-side portion of the side load-transmitting member 120 overlaps the floor-side cross member 110, and a lower-side portion of the side load-transmitting member 120 overlaps the second battery-side cross member 25B. That is, the side load-transmitting member 120 overlaps the floor-side cross member 110 in the vehicle side view, and comprises the inside upper vertical wall portion (first vertical wall portion) 123 which extends in the vertical direction and the inside lower vertical wall portion (second vertical wall portion) 124 which overlaps the battery case 10 in the vehicle side view and extends in the vertical direction. Herein, a lower portion of the inside upper vertical wall portion 123 may be configured to overlap an upper portion of the battery case 10.

First-fourth ribs 131-134 are integrally formed at the inside of the side load-transmitting member 120. The first rib 131 extends in the vehicle width direction at a point which is upward spaced apart from the middle wall portion 125, and an inner end portion, in the vehicle width direction, of the first rib 131 is connected to a central portion, in the vertical direction, of the inside upper vertical wall portion 123. The first rib 131 is inclined such that its outside is located at a higher level.

The second rib 132 extends in the vehicle width direction at a point which is downward spaced apart from the first rib 131, and an inner end portion, in the vehicle width direction, of the second rib 132 is connected to an upper end portion of the inside lower vertical wall portion 124. An outer end portion, in the vehicle width direction, of the second rib 132 is connected to a central portion, in the vertical direction, of the outside wall portion 122. The first rib 131 and the second rib 132 may be provided to extend mostly horizontally or be inclined such that its inside is located at a higher level or its outside is located at a higher level.

The third rib 133 extends upward from the upper end portion of the inside lower vertical wall portion 124. An upper end portion of the third 133 is connected to a central portion, in the vertical direction, of the upper wall portion 121. The third rib 133 is inclined such that its upper side is positioned on the further outward side. An outer end portion, in the vehicle width direction, of the first rib 131 is connected to a central portion, in the vertical direction, of the third rib 133.

The fourth rib 134 extends in the vehicle width direction at a point which is upward spaced apart from the second rib 132. An inner end portion, in the vehicle width direction, of the fourth rib 134 is connected to the central portion, in the vertical direction, of the third rib 133. An outer end portion, in the vehicle width direction, of the fourth rib 134 is connected to the central portion, in the vertical direction, of the outside wall portion 122. The inner end portion, in the vehicle width direction, of the fourth rib 134 and the outer end portion, in the vehicle width direction, of the first rib 131 are connected via the third rib 133, and a single rib which is continuous in the vehicle width direction is constituted by the first rib 131 and the fourth rib 134. The number or shape of the ribs provided inside the side load-transmitting member 120 are not limited to the above-described ones. The number of the ribs may be three or less, or five or more.

The battery case 10 is fixed to the side sill 73 and also fixed directly to the side load-transmitting member 120. Plural metal-made cylindrical members 140 which extend in the vertical direction are fixed to the left-side member 20 of the battery case 10. The longitudinal distance between the plural cylindrical members 140 can be set at about tens of centimeters, for example. As shown in FIG. 2, the plural cylindrical members 140 are provided to be spaced apart from each other in the longitudinal direction. A bolt 141 is inserted into each of the cylindrical members 140 from below.

Meanwhile, an opening where a shaft portion of the bolt 141 are inserted is formed at a portion of the side sill 73 which corresponds to an inner face of the first recess portion 73a. Likewise, the middle wall portion 125 of the side load-transmitting member 120 has an opening where the shaft portion of the bolt 141 is inserted. These both openings match each other. A nut 142 is stored inside the side load-transmitting member 120. The nut 142 is fixed to an upper face of the middle wall portion 125 of the side load-transmitting member 120. The number and position of the openings and the nuts 142 match those of the cylindrical members 140.

Accordingly, by inserting the bolts 141 into the cylindrical members 140 and subsequently into the opening of the side sill 73 and the opening of the side load-transmitting member 120 such that the bolts 141 are threaded in the nuts 142, plural points of the left side of the battery case 10 can be fixed to the side load-transmitting member 120 and the side sill 73. The right side of the battery case 10 can be fixed similarly.

While the present embodiments describes a case where the side load-transmitting member 120 is formed integrally, the side load-transmitting member 120 may be formed by combining plural members. For example, an inside part, in the vehicle width direction, of the side load-transmitting member 120 and an outside part, in the vehicle width direction, of the side load-transmitting member 120 are formed separately, and then these parts are assembled together, which is not illustrated. Thus, the side load-transmitting member 120 can be constituted as a two-split structure. Further, a three-split structure is appliable as well.

As shown in FIG. 7 and others, the upper structural body 3 comprises a pair of right-and-left hinge pillars 150. The right-side hinge pillar 150 extends upward from a front end portion of the right-side side sill 73. Further, as shown in FIG. 2, the left-side hinge pillar 150 extends upward from a front end portion of the left-side side sill 73. Right-and-left front doors 81 (shown in FIG. 1) are respectively attached to the right-and-left hinge pillars 150.

Further, as shown in FIG. 10, the upper structural body 3 comprises a pair of right-and-left center pillars 157. The right-side center pillar 157 extends upward from a central portion, in the longitudinal direction, of the right-side side sill 73. Moreover, as shown in FIG. 2, the left-side center pillar 157 extends upward from a central portion, in the longitudinal direction, of the left-side side sill 73. The right-and-left rear doors 82 (shown in FIG. 1) are respectively attached to the right-and-left center pillars 157.

As shown in FIG. 9, the upper structural body 3 comprises a pair of right-and-left floor reinforcements (first longitudinal load-transmitting members) 151. The floor reinforcement 151 extends in the longitudinal direction along the upper face of the front floor portion 70a. A front end portion of the right-side floor reinforcement 151 is connected to a rear end portion of the right-side front side frame 72. A rear end portion of the right-side floor reinforcement 151 is connected to a front end portion of the right-side side sill 73. Accordingly, since the front side frame 72 and the side sill 73 are connected by the floor reinforcement 151, when the collision load is inputted to the front side fame 72 in the vehicle frontal collision, for example, this collision load is transmitted to the side sill 73 via the floor reinforcement 151.

The floor reinforcement 151 is configured such that it protrudes upward with its lower side opened, and this protrusion shape is continuous over its whole length from a front end portion to a rear end portion of the floor reinforcement 151. A closed-cross section is formed by the floor reinforcement 151 and the front floor portion 70a by attaching the floor reinforcement 151 to the upper face of the front floor portion 70a.

Since the side sill 73 is positioned on the outward side, in the vehicle width direction, of the front side frame 72, the floor reinforcement 151 extends, curving in the plan view, such that its rear side is positioned further outward, in the vehicle width direction. This curve shape of the floor reinforcement 151 matches a shape of a lower end portion of the front wheelhouse portion 85. That is, the floor reinforcement 151 extends along the lower end portion of the front wheelhouse portion 85 and is connected integrally to the front wheelhouse 85. Herein, the left-side floor reinforcement (not illustrated) is laterally-symmetrical to the right-side one.

Further, in the plan view, a portion (rear end portion) of the right-side floor reinforcement 151 which is positioned on the side of the side sill 73 and a portion (rear end portion) of the right-side outside connection portion 30 which is positioned on the side of the battery case 10 overlap each other. Since the rear end portion of the floor reinforcement 151 is the portion connected to the side sill 73, this rear end portion is arranged adjacently to the side sill 73. Meanwhile, since the outside connection portion 30 is the member connected to the battery case 10, this portion 30 is separated from the side sill 73. However, overlapping of the rear end portion of the outside connection portion 30 and the rear end portion of the floor reinforcement 151 in the plan view means that the rear end portion of the outside connection portion 30 can be made close to the side sill 73. Accordingly, the collision load from the vehicle-front side can be securely applied toward the side sill 73 through the outside connection portion 30. This situation is the same for the left-side structure.

A rear end portion of the right-side floor reinforcement 151 and a base end portion (lower end portion) of the right-side hinge pillar 150 are arranged at the same position in the longitudinal direction. That is, a portion of the side sill 73 which is positioned near the base end portion of the hinge pillar 150 has the high rigidity in particular, so that by connecting the rear end portion of the floor reinforcement 151 to this high-rigidity portion, the collision load can be efficiently absorbed by the side sill 73.

As shown in FIG. 7, the upper structural body 3 comprises a pair of right-and-left lower load-transmitting members (second longitudinal load-transmitting members) 152. The lower load-transmitting member 152 is arranged above the front flame member 11 of the lower structural body 2, and the front frame member 11 and the lower load-transmitting member 152 are spaced apart from each other in the vertical direction. Further, the lower load-transmitting member 152 extends in the longitudinal direction along a lower face of the front floor portion 70*a*. As schematically shown in FIG. 11, a front end portion of the right-side lower load-transmitting member 152 is connected to a rear end portion of the right-side front side frame 72. Herein, since the lower load-transmitting member 152 extends toward the front portion of the battery case 10, when the collision load of the vehicle frontal collision is inputted to the front side frame 72 toward the vehicle rear side, for example, this collision load is transmitted to the front portion of the battery case 10 through the lower load-transmitting member 152. The left-side lower load-transmitting member 152 is laterally symmetrical to the right-side one.

The lower load-transmitting member 152 is configured such that it protrudes downward with its upper side opened, and this protrusion shape is continuous over its whole length from a front end portion to a rear end portion of the lower load-transmitting member 152. A closed-cross section is formed by the lower load-transmitting member 152 and the front floor portion 70*a* by attaching the lower load-transmitting member 152 to the lower face of the front floor portion 70*a*.

A rear portion of the right-side lower load-transmitting member 152 is located at a position inside the battery case 10 which is located on the right side of the front center member 26 and on the left side of the right-side member 21. Further, a rear portion of the left-side lower load-transmitting member 152 is located at a position inside the battery case 10 which is located on the left side of the front center member 26 and on the right side of the left-side member 21.

As shown in FIGS. 7-9, a cross member 153 which extends in the lateral direction and interconnects the rear portion of the left-side lower load-transmitting member 152 and the rear portion of the right-side lower load-transmitting member 152 is provided at the lower face of the front floor portion 70*a*. The cross member 153 is configured such that it protrudes downward with its upper side opened and has a cross section whose shape is mostly similar over a whole length, in the vehicle width direction, thereof. By attaching the cross member 153 to the lower face of the front floor portion 70*a*, a closed-cross section is formed by the cross member 153 and the front floor portion 70*a*. The rear portion of the lower load-transmitting member 152 can be suppressed from being displaced in the lateral direction by providing the cross member 153 when the right-and-left lower load-transmitting members 152 receive the collision load of the vehicle frontal collision.

As shown in FIG. 11, the front-end member 22 which constitutes the front portion of the battery case 10 is arranged just below the cross member 153. The front-end member 22 is fastened to the cross member 153 by bolts and nuts (not illustrated). This fastening structure of the front-end member 22 can be the same as that of the left-side member 20 to the side sill 73.

A protrusion portion 22*a* which protrudes upward is provided at the front portion of the battery case 10. Specifically, the protrusion portion 22*a* is provided at a portion of the front-end member 22 which is positioned in back of the cross member 153. This protrusion portion 22*a* is located on the rear side of the rear portion of the lower load-transmitting member 52. Further, an upper end portion of the protrusion portion 22*a* is located at the higher level than a lower face of the cross member 153 and located at the higher level than a lower face of the rear portion of the lower load-transmitting member 152. Thereby, the cross member 153 and the lower load-transmitting member 152 overlaps the protrusion portion 22*a* in a longitudinal view. The protrusion portion 22*a* is a portion where the collision load is transmitted from the lower load-transmitting member 152 when the lower load-transmitting member 152 is retreated by the collision load in the vehicle frontal collision.

The protrusion portion 22*a* extends continuously in the lateral direction. That is, while it may be considered that the rear portion of the lower load-transmitting member 152 is displaced laterally in the vehicle frontal collision, since the protrusion portion 22*a* is continuous in the lateral direction, the collision load is securely inputted to the protrusion portion 22*a* even if the rear portion of the lower load-transmitting member 152 is displaced in the lateral direction. Herein, the protrusion portion 22*a* is not limited to this one configured to be continuous in the lateral direction, but any protrusion portion which is configured to be discontinuous may be applicable as long as its part overlaps the rear portion of the lower load-transmitting member 152 in the longitudinal view.

The protrusion portion 22*a* may be formed integrally with or separated from the front-end member 22. In a case where the front-end member 22 is the extruded member, the protrusion portion 22*a* can be integrated easily. The protrusion portion 22*a* may be fixed to the bottom plate 24, for example, or fixed to the left-side member 20, the right-side member 21, or the like. The protrusion portion 22*a* may be of a plate shape (rib shape), a bar shape, a cylindrical shape, or the like. The reinforcing effect of the front-end member 22 can be obtained by forming the rib-shaped protrusion portion 22*a* integrally with the front-end member 22.

The rear portion of the lower load-transmitting member 152 and the protrusion portion 22*a* are arranged such that they are spaced apart from each other in the longitudinal direction, having a specified distance therebetween. Thereby, since the lower load-transmitting member 152 and the protrusion portion 22*a* do not contact each other during the normal vehicle-traveling, an interference noise or the like are prevented from being generated. Meanwhile, since the rear portion of the lower load-transmitting member 152 contacts the protrusion portion 22*a* when the lower load-transmitting member 152 moves rearward in the vehicle frontal collision, the collision load is securely inputted to the protrusion portion. That is, the above-described specified distance is set such that the lower load-transmitting member 152 and the protrusion portion 22*a* do not contact each other during the normal vehicle-traveling but the rear portion of the lower load-transmitting member 152 contacts the protrusion portion 22*a* in the vehicle frontal collision. This distance can be set at several mm-several cm, for example. Herein, the rear portion of the lower load-transmitting member 152 and the protrusion portion 22*a* may be configured to contact each other. Further, the rear portion of the lower load-transmitting member 152 and the protrusion portion 22*a* may be connected by a fastening member.

In the embodiment shown in FIG. 6, the front enter member 26 inside the battery case 10 is provided below the front floor portion 70a, and its height is higher than the first-third rear center members 27-29. Accordingly, since the vertical dimension of the front center member 26 becomes long, the front center member 26 having a large cross section is positioned at the front portion of the battery case 10. Thereby, the battery case 10 can be suppressed from being deformed when receiving the collision load transmitted from the lower load-transmitting member 152 at its front portion.

(Connection Structure of Rear Portion of Battery Case and Upper Structural Body)

Figure 13:
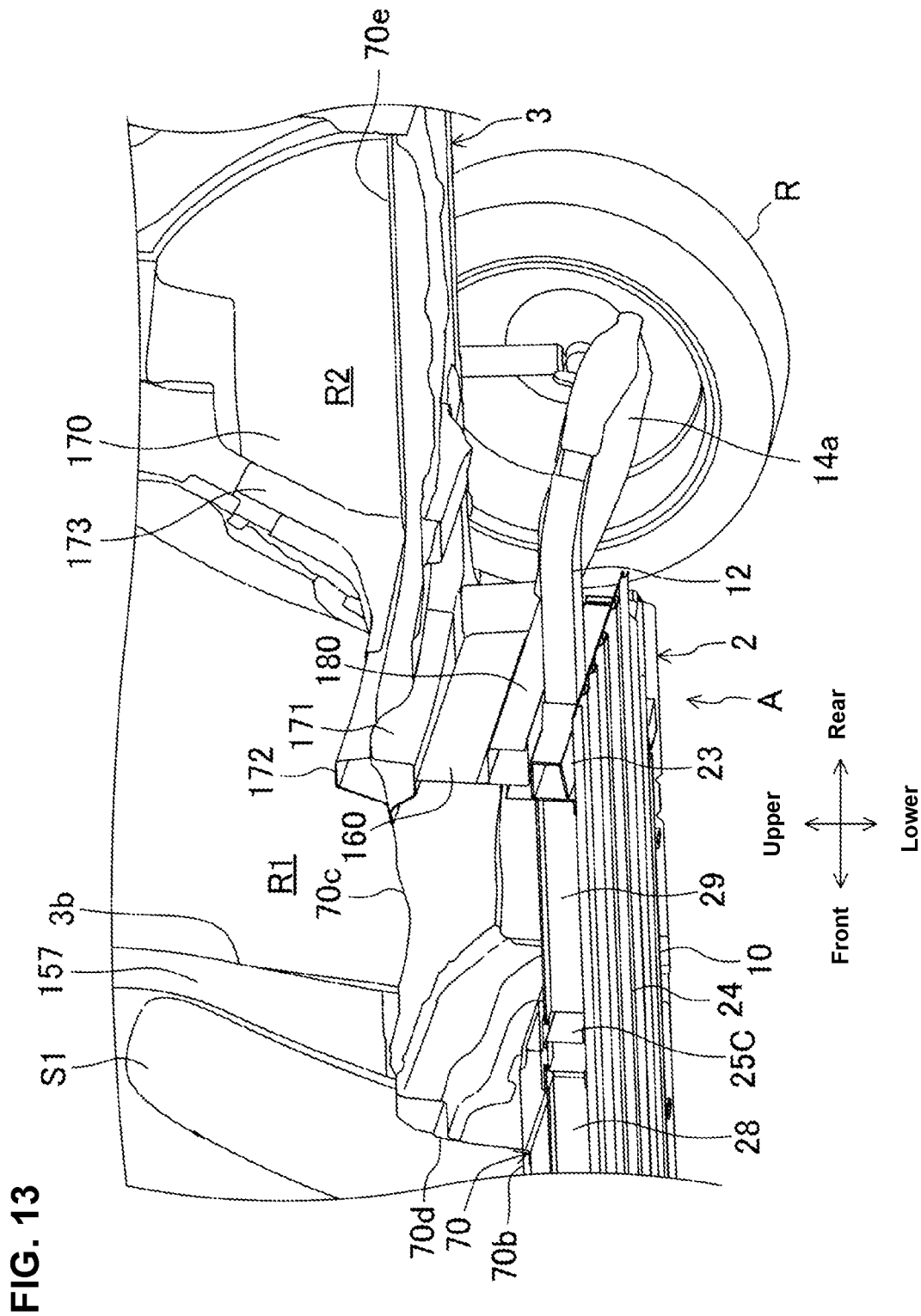
FIG. 13 is a perspective view, when viewed from a vehicle lower side, which shows a cross section of a rear portion of the electric automotive vehicle.

As shown in FIG. 13, the rear portion of the battery case 100 and the upper structural body 3 are connected by a connecting member 160. The structure of the rear side of the upper structural body 3 will be described before describing this connection structure. Rear wheelhouse portions 170 (only the right one is illustrated in FIGS. 7-9) which accommodate the right-and-left rear wheels R are provided at right-and-left both sides of a rear portion of the upper structural body 3. A baggage-room floor portion 70e which constitutes a floor face of the baggage room R2 extends rearward from a rear portion of the kickup portion 70c and is located at a higher level than the rear floor portion 70b. The rear floor portion 70b is referred to as a first floor portion, and the kickup portion 70c and the baggage-room floor portion 70e are referred to as a second floor portion which are relatively high. A left end portion of the baggage-room floor portion 70e is connected to a lower portion of the left-side rear wheelhouse portion 170 (shown in FIG. 2), and a right end portion of the baggage-room floor portion 70e is connected to the right-side rear wheelhouse portion 170 (shown in FIGS. 7-9).

As shown in FIGS. 7-9, a rear cross member (first cross member) 171 which extends in the lateral direction is attached to a lower face of the kickup portion 70c. The rear cross member 171 is configured such that it protrudes downward and is opened upward, wherein its protrusion shape is continuous over its width from a left end portion to a right end portion. A closed-cross section is formed by the rear cross member 171 and the kickup portion 70c by attaching the rear cross member 171 to a lower face of the kickup portion 70c.

A rear-floor-side cross member 172 which extends in the lateral direction just above the rear cross member 171 is attached to an upper face of the kickup portion 70c. The rear-floor-side cross member 172 is configured such that it protrudes upward and is opened downward, wherein its protrusion shape is continuous over its width from a left end portion to a right end portion. A closed-cross section is formed by the rea-floor-side cross member 172 and the kickup portion 70c by attaching the rear-floor-side cross member 172 to an upper face of the kickup portion 70c.

Further, a right end portion of the rear-floor-side cross member 172 is connected to the right-side rear wheelhouse portion 170, and a left end portion of the rear-floor-side cross member 172 is connected to the left-side rear wheelhouse portion 170. Further, a lower end portion of a side-portion reinforcement 173 which extends upward along the right-side rear wheelhouse portion 170 is connected to the right end portion of the rear-floor-side cross member 172. Moreover, a left end portion of a side-portion reinforcement (not illustrated) which extends upward along the left-side rear wheelhouse portion 170 is connected to the left end portion of the rear-floor-side cross member 172. An upper portion of the right-side side-portion reinforcement 173 and an upper portion of the left-side side-portion reinforcement are connected by a connecting member 174 (shown in FIGS. 8 and 9) which extends in the lateral direction. That is, a ring-shaped structure is formed by the rear-floor-side cross member 172, the right-and-left side-portion reinforcements 173, and the connecting member 174. This ring-shaped structure may be formed by using a reinforcement (not illustrated) which is provided up to the side of the roof 80.

Meanwhile, as shown in FIG. 13, the battery case 10 comprises a case-side cross member (second cross member) 180 (illustration is omitted in FIGS. 2-6). The case-side cross member 180 extends in the lateral direction and is attached to the rear-end member 23 which constitutes the rear portion of the battery case 10. The case-side cross member 180 is located above the rear-end member 23. The case-side cross member 180 and the rear cross member 171 are provided to face each other in the vertical direction.

As shown in FIG. 13, the connecting member 160 is the one to connect the rear-end member 23 of the battery case 10 and the kickup portion 70c. Thereby, since the kickup portion 70c is reinforced by using the battery case 10, the rigidity of the kickup portion 70c is improved. This rigidity improvement of the kickup portion 70c causes improvement of the whole rigidity of the floor panel 70. While the connecting member 160 is formed by a plate member which extends in the lateral direction and in the vertical direction in the present embodiment, a member having a closed-cross section extending vertically or obliquely, a shaft-shaped member, a cylindrical member, or the like is applicable instead of the plate member. Further, the connecting member 160 may be constituted by plural members.

An upper portion of the connecting member 160 is fixed to a lower portion of the rear cross member 171. Thereby, the battery case 10 and the kickup portion 70c are connected via the rear cross member 171 by the connecting member 160. That is, since the upper portion of the connecting member 160 can be fixed to a portion where the rigidity is improved by providing the rear cross member 171, fixation strength of the connecting member 160 fixed to the kickup portion 70c can be increased. The fixation structure of the upper portion of the connecting member 160 can be constituted by a detachable fastening structure using a fastening member, such as bolts and nuts (not illustrated), for example. Herein, the upper portion of the connecting member 160 may be directly connected to the kickup portion 70c.

Further, a lower portion of the connecting member 160 is fixed to the case-side cross member 180 which constitutes part of the battery case 10. Thereby, since the lower portion of the connecting member 160 can be fixed to a portion of the battery case 10 where the rigidity is improved, fixation strength of the connecting member 160 fixed to the battery case 10 can be increased. Herein, the lower portion of the connecting member 160 may be detachably fixed to the battery case 10 by the above-described fastening member. The connecting member 160 may be a member positioned on the side of the upper structural body 3 or a member positioned on the side of the lower structural body 2.

(Positional Relationship Among Cross Members of Upper Structural Body and Lower Structural Body)

Figure 14:
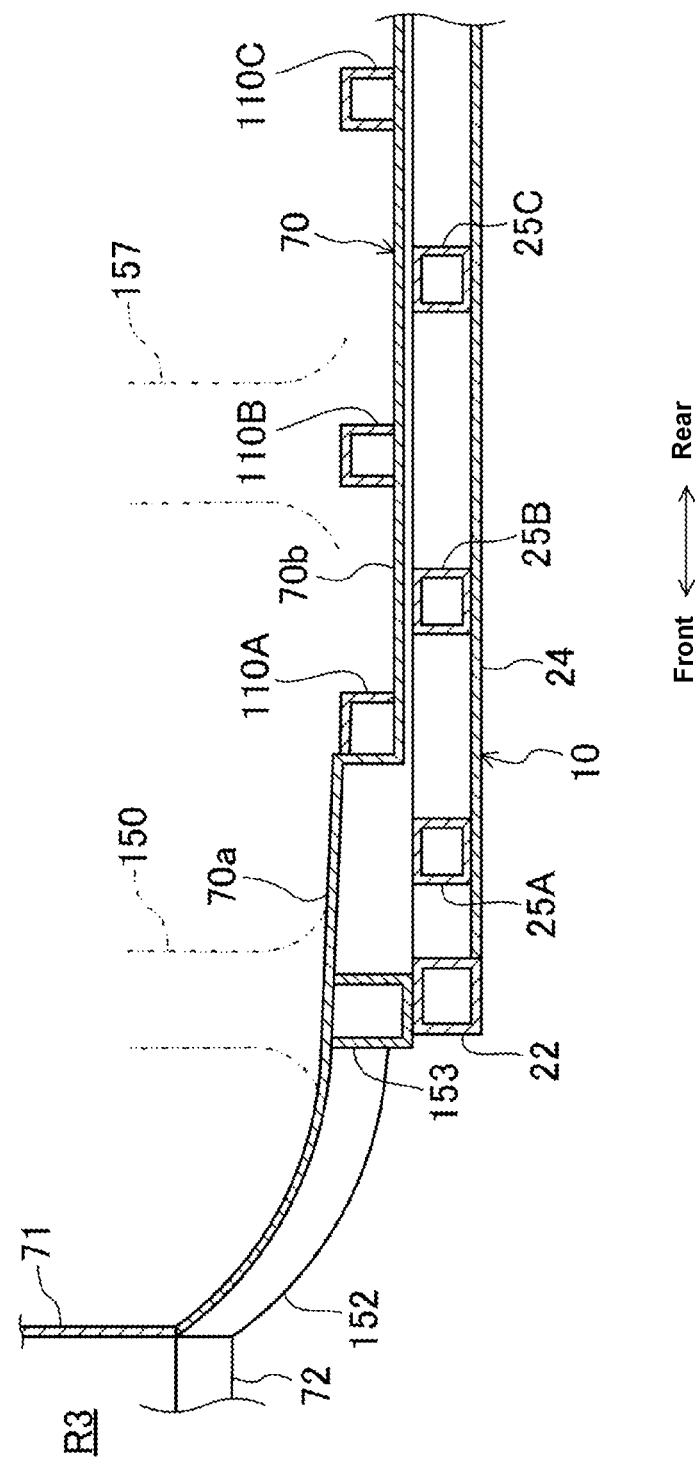
FIG. 14 is a diagram schematically showing the floor panel and the battery unit according to a modified embodiment.

FIG. 14 is a schematical view showing positional relationship among cross members of the upper structural body 3 and the lower structural body 2 according to a modified embodiment. First-third floor-side cross members 110A, 110B, 110C extending in the vehicle width direction are attached to the upper face of the floor panel 70 of the upper structural body 3, and the cross member 153 is attached to the lower face of the floor panel 70. Since the cross member 153 is attached to the floor panel 70, this member is a floor-side cross member.

The first floor-side cross member 110A is the above-described cross member 110 and provided to be spaced rearward apart from the cross member 153. The second floor-side cross member 110B is spaced rearward apart from the first floor-side cross member 110A. The third floor-side cross member 110C is spaced rearward apart from the second floor-side cross member 110B. Meanwhile, the above-described first-third battery-side cross members 25A, 25B, 25C are provided at the battery case 10 of the lower structural body 2. The cross member 153, the first-third floor-side cross members 110A, 110B, 110C, and the first-third battery-side cross members 25A, 25B, 25C overlap the side sill 73 (shown in FIG. 10 and others) in the side view.

The cross member 153/the first-third floor-side cross members 110A, 110B, 110C and the first-third battery-side cross members 25A, 25B, 25C are offset from each other in the vehicle longitudinal direction in the vehicle side view. That is, the cross member 153, the first battery-side cross member 25A, the first floor-side cross member 110A, the second battery-side cross member 25B, the second floor-side cross member 110B, the third battery-side cross member 25C, and the third floor-side cross member 110C are positioned in order from the vehicle front side to the vehicle rear side, and the cross member 153, the first-third floor-side cross members 110A, 110B, 110C and the first-third battery-side cross members 25A, 25B, 25C are provided alternately in the longitudinal direction.

For example, regarding the first floor-side cross member 110A and the second floor-side cross member 110B, the second battery-side cross member 25B is positioned in front of the first floor-side cross member 110A and in back of the second floor-side cross member 110B. Meanwhile, regarding the first battery-side cross member 25A and the second battery-side cross member 25B, the first floor-side cross member 110A is positioned in back of the first battery-side cross member 25A and in front of the second battery-side cross member 25B. This positional relationship is referred to as "being offset in the vehicle longitudinal direction."

Herein, this "being offset in the vehicle longitudinal direction" may include another embodiment. For example, an embodiment where a center, in the longitudinal direction, of the first floor-side cross member 110A and a center, in the longitudinal direction, of the second battery-side cross member 25B are offset from each other in the longitudinal direction can be included. This case includes the embodiment shown in FIG. 14, and also an embodiment where a rear portion of the first floor-side cross member 110A and a front portion of the second battery-side cross member 25B overlap each other in the plan view is included.

Further, an embodiment where a front portion of the first floor-side cross member 110A is positioned in front of a front portion of the second battery-side cross member 25B and another embodiment where a rear portion of the second battery-side cross member 25B is positioned in back of a rear portion of the first floor-side cross member 110A, for example, are included in the "being offset in the vehicle longitudinal direction" as well.

The collision load of the vehicle side collision can be received by the cross member 153/the first-third floor-side cross members 110A, 110B, 110C and the first-third battery-side cross members 25A, 25B, 25C. Since the cross member 153/the first-third floor-side cross members 110A, 110B, 110C and the first-third battery-side cross members 25A, 25B, 25C are offset from each other in the vehicle longitudinal direction as described above, even if the obstacle is a slender object like a pole, for example, the collision load of the obstacle can be inputted to any of the floor-side cross members 153, 110A, 110B, 110C and the battery-side cross members 25A, 25B, 25C.

In the vehicle side view, only the floor-side cross members 110A, 110B, 110C and the battery-side cross members 25A, 25B, 25C, which are located in a non-overlapping area with the hinge pillar 150 (shown by an imaginary line in FIG. 14), are offset from each other in the longitudinal direction. That is, the floor-side cross members 110A, 110B, 110C and the battery-side cross members 25A, 25B, 25C, which are positioned in back of the hinge pillar 150 are offset from each other in the longitudinal direction. That is, since an area where the hinge pillar 150 is provided has the higher strength against the collision load inputted from the side, the collision load can be received by the hinge pillar 150 even if the floor-side cross members and the battery-side cross members are not offset from each other in the longitudinal direction.

Likewise, only the floor-side cross members 110A, 110B, 110C and the battery-side cross members 25A, 25B, 25C, which are located in the non-overlapping area with the center pillar 157, may be offset from each other in the longitudinal direction in the vehicle side view.

(Operational Effect in Vehicle Frontal Collision)

Next, the case where the electric automotive vehicle 1 which is configured as described above has the frontal collision will be described. The collision load of the vehicle frontal collision is inputted to the right-and-left front side frames 72 through the front bumper reinforcement 86. Further, the collision load of the vehicle frontal collision is inputted to the right-and-left front frame members 11 as well.

Since the front frame member 11 is configured such that the plural points, in the longitudinal direction, of the front frame member 11 are connected to the left-side front side frame 72 by the left-side connection portions 53, 54, respectively, the left-side front frame member 11 where the collision load is inputted becomes stable, so that this member 11 is suppressed from being easily inclined in the lateral direction or in the vertical direction. This situation is the same for the right-side front frame member 11. Thereby, the collision load is straightly transmitted to the front portion of the battery case 10 through the right-and-left front frame members 11.

Herein, since the front frame member 11 is connected to the battery case 10 at the plural points which are spaced apart from each other in the lateral direction by the outside connection portion 30 and the inside connection portion 31, the collision load inputted to the front fame member 11 is inputted to the plural points, in the lateral direction, of the battery case 10. Since the battery case 10 comprises the front center member 26, the left-side member 20, and the right-side member 21 which extend in the longitudinal direction, the collision load inputted to the plural points which are spaced apart from each other in the lateral direction is dispersed to the front center member 26, the left-side member 20, and the right-side member 21. Thereby, the collision load can be absorbed by positively using the battery case 10, so that the absorption quantity of the collision load by means of the lower structural body 2. Consequently, the weight reduction of the vehicle can be attained by optimizing the strength of the front side frame 72 and the strength of the members positioned near the rear end portion of the front side frame 72.

Further, the collision load inputted to the front side frame 72 is transmitted to the side sill 73 through the floor reinforcement 151. Moreover, since the outside connection portion 30 extends toward the side sill 73, the collision load inputted to the front frame member 11 can be also applied toward the side sill 73 through the outside connection portion 30. Herein, since the front reinforcement 151 and the outside connection portion 30 are spaced apart from each other in the vertical direction, a route of the collision load where the collision load is transmitted from the front side frame 72 to the side sill 73 is different from another route of the collision load where the collision load is transmitted from the front frame member 11 to the side sill 73. Accordingly, the collision load is transmitted to the side sill 73 through the plural routes. This side sill 73 is a member which has the high rigidity among the members constituting the vehicle body, in particular, so that the collision load can be absorbed by the side sill 73.

Further, the collision load inputted to the front side frame 72 is transmitted to the battery case 10 from the rear portion of the front side frame 72 through both of the floor reinforcement 151 and the lower load-transmitting member 152. Thereby, since another route of the collision load where the collision load is transmitted to the battery case 10 through the lower load-transmitting member 152 is formed as well, the collision load is dispersed and absorbed by the side sill 73 and the battery case 10. Moreover, since the floor reinforcement 151 and the lower load-transmitting member 152 extend along the floor panel 70, part of the collision load inputted to the floor reinforcement 151 and the lower load-transmitting member 152 is also transmitted to the floor panel 70 and absorbed by the floor panel 70.

Herein, while the large collision load is inputted to either of the right side and the left side in a case of an offset frontal collision of the vehicle, the present embodiment is effective in this case as well. Further, since the rear frame member 12 is provided, the same operational effect can be obtained even in a case of the vehicle rear collision.

(Operational Effect in Vehicle Side Collision)

Next, the case where the electric automotive vehicle 1 which is configured as described above has the side collision will be described. The collision load of the vehicle side collision is inputted to the side sill 73 from the outward side, in the vehicle width direction, of the vehicle body toward the inward side, in the vehicle width direction, of the vehicle body. Since the side load-transmitting member 120 is provided inside the side sill 73, the collision load is inputted to the side load-transmitting member 120 from the outward side, in the vehicle width direction, of the vehicle body toward the inward side, in the vehicle width direction, of the vehicle body. Herein, since the inside upper vertical wall portion 123 of the side load-transmitting member 120 overlaps the cross members 110, 153 positioned on the floor side and the inside lower vertical wall portion 124 of the side load-transmitting member 120 overlaps the battery case 10, the collision load is dispersed and transmitted to the cross members 110, 153 positioned on the floor side and the battery case 10. Since the cross members 110, 153 positioned on the floor side extend in the vehicle width direction in a state where these are attached to the floor panel 70, a resistant force against the load applied from the vehicle side is large. Thereby, part of the collision load is absorbed and the collision load inputted to the battery case 10 is reduced, so that the battery B can be protected. Moreover, since the first-third battery-side cross members 25A, 25B, 25C, the front-end member 22, and the rear-end member 23 are provided at the battery case 10, the collision load can be absorbed by the battery case 10 as well.

Further, when the obstacle like the pole, for example, hits against the vehicle from the vehicle side, since the cross member 153/the floor-side cross members 110A, 110B, 110C and the first-third battery-side cross members 25A, 25B, 25C are offset from each other in the vehicle longitudinal direction as shown in FIG. 14, the collision load can be inputted to any of these cross members. Herein, it may be considered that a slender pole hits between the first floor-side cross member 110A and the second battery-side cross member 25B. In this case, after the side load-transmitting member 120 having the high strength receives the collision load of this pole, the collision load can be dispersed and absorbed by at least the first floor-side cross member 110A and the second battery-side cross member 25B.

Moreover, in a case where the obstacle is a pole having the large diameter, the automobile, or the like, the collision load is inputted to both of the floor-side cross members 110A, 110B, 110C and the first-third battery-side cross members 25A, 25B, 25C, so that the collision load can be dispersed and transmitted to the floor panel 70 and the battery case 10.

The present invention should not be limited to the above-described embodiments, and any other modifications or improvements may be applied within the scope of a spirit of the present invention.

As described above, the vehicle-body structure according to the present invention is properly applicable to any electric automotive vehicle provided with the driving motor and the battery.

What is claimed is:

1. A vehicle-body structure of an electric automotive vehicle, in which a motor for vehicle driving is provided and a battery case where a battery to supply electric power to the motor for vehicle driving is stored is arranged below a floor panel, comprising:
    a floor-side cross member attached to the floor panel and extending in a vehicle width direction along the floor panel;
    a battery-side cross member provided at the battery case and extending in the vehicle width direction,
    a pair of right-and-left side sills extending in the vehicle longitudinal direction at both end portions, in the vehicle width direction, of said floor panel; and
    a pair of right-and-left pillars extending upward respectively from said side sills,
    wherein said floor-side cross member and said battery-side cross member are offset from each other in a vehicle longitudinal direction in a vehicle side view, and
    wherein only said floor-side cross member and said battery-side cross member, which are located in a non-overlapping area with said pillar, are offset from each other in the longitudinal direction in the vehicle side view.

2. The vehicle-body structure of the electric automotive vehicle of claim 1, wherein said floor-side cross member is attached to an upper face of said floor panel.

3. The vehicle-body structure of the electric automotive vehicle of claim 2, wherein said floor-side cross member and said battery-side cross member respectively overlap a pair of right-and-left side sills which are provided to extend in the vehicle longitudinal direction at both end portions, in the vehicle width direction, of said floor panel in the vehicle side view.

4. The vehicle-body structure of the electric automotive vehicle of claim 3, wherein said floor-side cross member and said battery-side cross member are provided alternately in the vehicle longitudinal direction.

5. The vehicle-body structure of the electric automotive vehicle of claim 2, wherein said floor-side cross member and said battery-side cross member are provided alternately in the vehicle longitudinal direction.

6. The vehicle-body structure of the electric automotive vehicle of claim 1, wherein said floor-side cross member is attached to an upper face of said floor panel.

7. The vehicle-body structure of the electric automotive vehicle of claim 6, wherein said floor-side cross member and said battery-side cross member are provided alternately in the vehicle longitudinal direction.

8. The vehicle-body structure of the electric automotive vehicle of claim 1, wherein said floor-side cross member and said battery-side cross member are provided alternately in the vehicle longitudinal direction.

9. The vehicle-body structure of the electric automotive vehicle of claim 1, wherein said floor-side cross member and said battery-side cross member respectively overlap a pair of right-and-left side sills which are provided to extend in the vehicle longitudinal direction at both end portions, in the vehicle width direction, of said floor panel in the vehicle side view.

10. A vehicle-body structure of an electric automotive vehicle in which a motor for vehicle driving is provided and a battery case where a battery to supply electric power to the motor for vehicle driving is stored is arranged below a floor panel, comprising:
  a floor-side cross member attached to the floor panel and extending in a vehicle width direction along the floor panel; and
  a battery-side cross member provided at the battery case and extending in the vehicle width direction,
  wherein said floor-side cross member and said battery-side cross member are offset from each other in a vehicle longitudinal direction in a vehicle side view, and
  wherein said floor-side cross member and said battery-side cross member respectively overlap a pair of right-and-left side sills which are provided to extend in the vehicle longitudinal direction at both end portions, in the vehicle width direction, of said floor panel in the vehicle side view.

11. The vehicle-body structure of the electric automotive vehicle of claim 10, wherein said floor-side cross member and said battery-side cross member are provided alternately in the vehicle longitudinal direction.

12. A vehicle-body structure of an electric automotive vehicle in which a motor for vehicle driving is provided and a battery case where a battery to supply electric power to the motor for vehicle driving is stored is arranged below a floor panel, comprising:
  a floor-side cross member attached to the floor panel and extending in a vehicle width direction along the floor panel; and
  a battery-side cross member provided at the battery case and extending in the vehicle width direction,
  wherein said floor-side cross member and said battery-side cross member are offset from each other in a vehicle longitudinal direction in a vehicle side view,
  wherein said floor-side cross member is attached to an upper face of said floor panel, and
  wherein said floor-side cross member and said battery-side cross member respectively overlap a pair of right-and-left side sills which are provided to extend in the vehicle longitudinal direction at both end portions, in the vehicle width direction, of said floor panel in the vehicle side view.

\* \* \* \* \*